US 6,569,934 B2

(12) United States Patent
Noel, III

(10) Patent No.: US 6,569,934 B2
(45) Date of Patent: May 27, 2003

(54) HIGH FLEXURAL MODULUS AND/OR HIGH HEAT DEFLECTION TEMPERATURE THERMOPLASTIC ELASTOMERS AND METHODS FOR PRODUCING THE SAME

(75) Inventor: Oscar French Noel, III, Aurora, CO (US)

(73) Assignee: Luzenac America, Inc., Englewood, CO (US)

( * ) Notice: Subject to any disclaimer, the term of this patent is extended or adjusted under 35 U.S.C. 154(b) by 0 days.

(21) Appl. No.: 09/882,326

(22) Filed: Jun. 14, 2001

(65) Prior Publication Data

US 2002/0013416 A1 Jan. 31, 2002

Related U.S. Application Data

(60) Provisional application No. 60/211,688, filed on Jun. 14, 2000.

(51) Int. Cl.$^7$ .................. C08L 23/00; C08L 23/04; C08K 3/00
(52) U.S. Cl. ............... 524/445; 524/449; 524/451; 525/191; 525/232; 525/240
(58) Field of Search ................. 524/445, 449, 524/451; 525/191, 232, 240

(56) References Cited

U.S. PATENT DOCUMENTS

| | | | |
|---|---|---|---|
| 3,950,303 A | 4/1976 | Lipscomb | |
| 4,178,328 A | 12/1979 | Thiruvillakkat | 525/98 |
| 4,251,576 A | 2/1981 | Osborn et al. | 428/331 |
| 4,385,136 A | 5/1983 | Ancker et al. | 523/215 |
| 4,405,727 A | 9/1983 | Brownscombe | 523/205 |
| 4,409,342 A | 10/1983 | Ancker et al. | 523/202 |
| 4,425,384 A | 1/1984 | Brownscombe | 427/221 |
| 4,430,468 A * | 2/1984 | Schumacher | 428/95 |
| 4,436,863 A | 3/1984 | Albee, Jr. et al. | 524/451 |
| 4,480,005 A | 10/1984 | Brownscombe | 428/336 |
| RE31,992 E | 9/1985 | Ancker et al. | 523/202 |
| 4,613,643 A * | 9/1986 | Nakamura et al. | 264/41 |
| 4,808,665 A * | 2/1989 | Patel et al. | 522/112 |
| 5,006,402 A | 4/1991 | Isayev | 428/294 |
| 5,122,398 A | 6/1992 | Seiler et al. | 428/31 |
| 5,128,417 A | 7/1992 | Suga et al. | 525/301 |
| 5,283,114 A | 2/1994 | Isayev | 428/294 |
| 5,290,886 A * | 3/1994 | Ellul | 524/515 |
| 5,403,889 A | 4/1995 | Sato | 525/71 |
| 5,478,887 A | 12/1995 | Huynh-Ba | 525/66 |
| 5,506,306 A | 4/1996 | Sato | 525/227 |
| 5,514,734 A | 5/1996 | Maxfield et al. | 523/204 |
| 5,585,420 A | 12/1996 | Grasmeder et al. | 523/400 |
| 5,693,714 A | 12/1997 | Bauman et al. | 525/104 |
| 5,747,560 A | 5/1998 | Christiani et al. | 523/209 |
| 5,773,503 A | 6/1998 | Steen et al. | 524/445 |
| 5,827,917 A | 10/1998 | Fourty | 524/451 |
| 5,916,953 A | 6/1999 | Jacoby et al. | 524/494 |
| 6,045,152 A | 4/2000 | Oda | 280/728.3 |
| 6,262,161 B1 | 7/2001 | Betso et al. | 524/425 |
| 6,297,301 B1 * | 10/2001 | Erderly et al. | 524/155 |
| 6,300,418 B1 * | 10/2001 | Brzoskowski et al. | 525/191 |
| 6,372,344 B1 * | 4/2002 | Castellani et al. | 174/110 A |

FOREIGN PATENT DOCUMENTS

WO    WO 01/02475 A1    1/2001

* cited by examiner

*Primary Examiner*—Nathan M. Nutter
(74) *Attorney, Agent, or Firm*—Sheridan Ross P.C.

(57) ABSTRACT

The present invention provides a mineral filled thermoplastic olefin (MFTPO) composition comprising a polymer mixture, a mineral and a flexural modulus modifying agent and/or a heat deflection temperature modifying agent, and a method for producing the same. The flexural modulus modifying agent and/or a heat deflection temperature modifying agent significantly increases the flexural modulus and/or a heat deflection temperature of the MFTPO without substantially affecting the falling weight impact resistance of the MFTPO relative to a similar MFTPO composition which lacks the flexural modulus modifying agent and/or a heat deflection temperature modifying agent.

14 Claims, 5 Drawing Sheets

Flexural modulus vs. EPDM content at 27% talc loading

The Effect of Talc Concentration on Flexural modulus

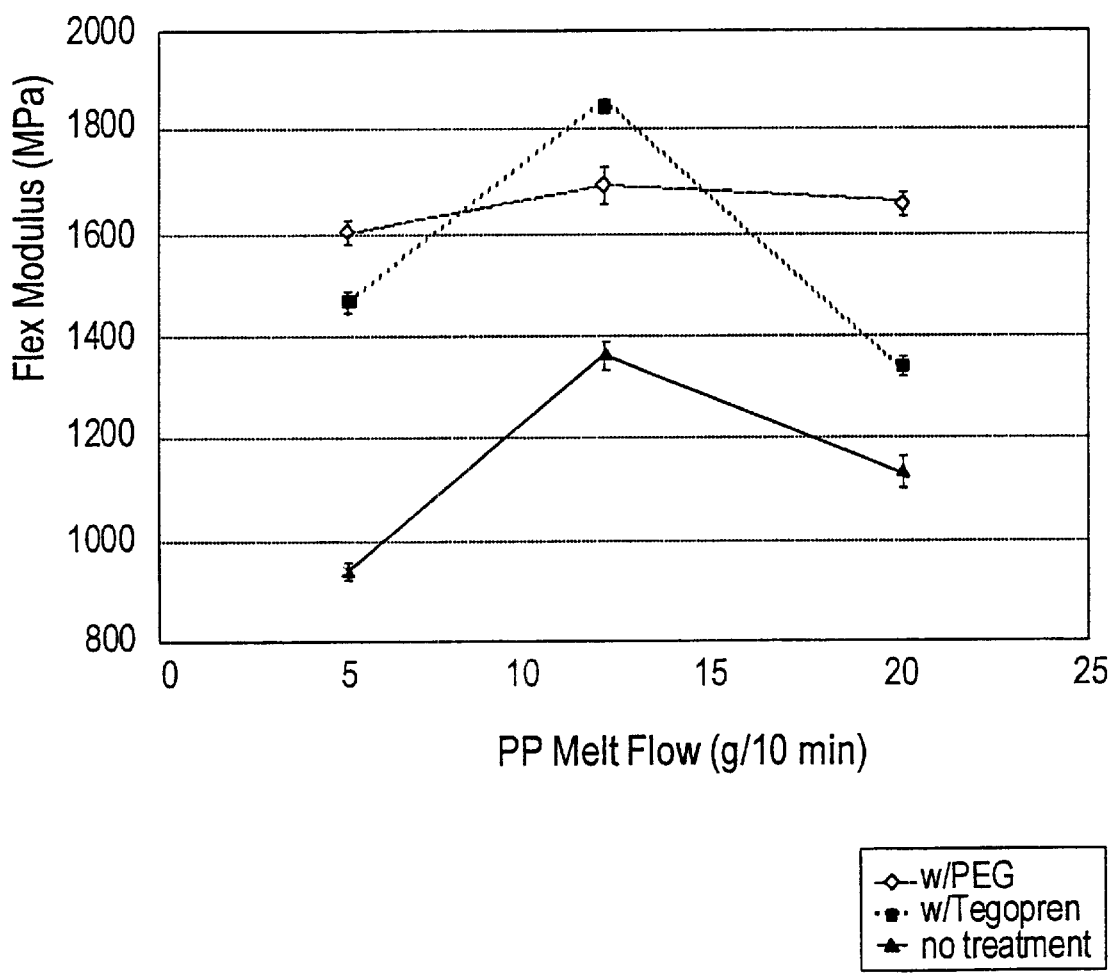

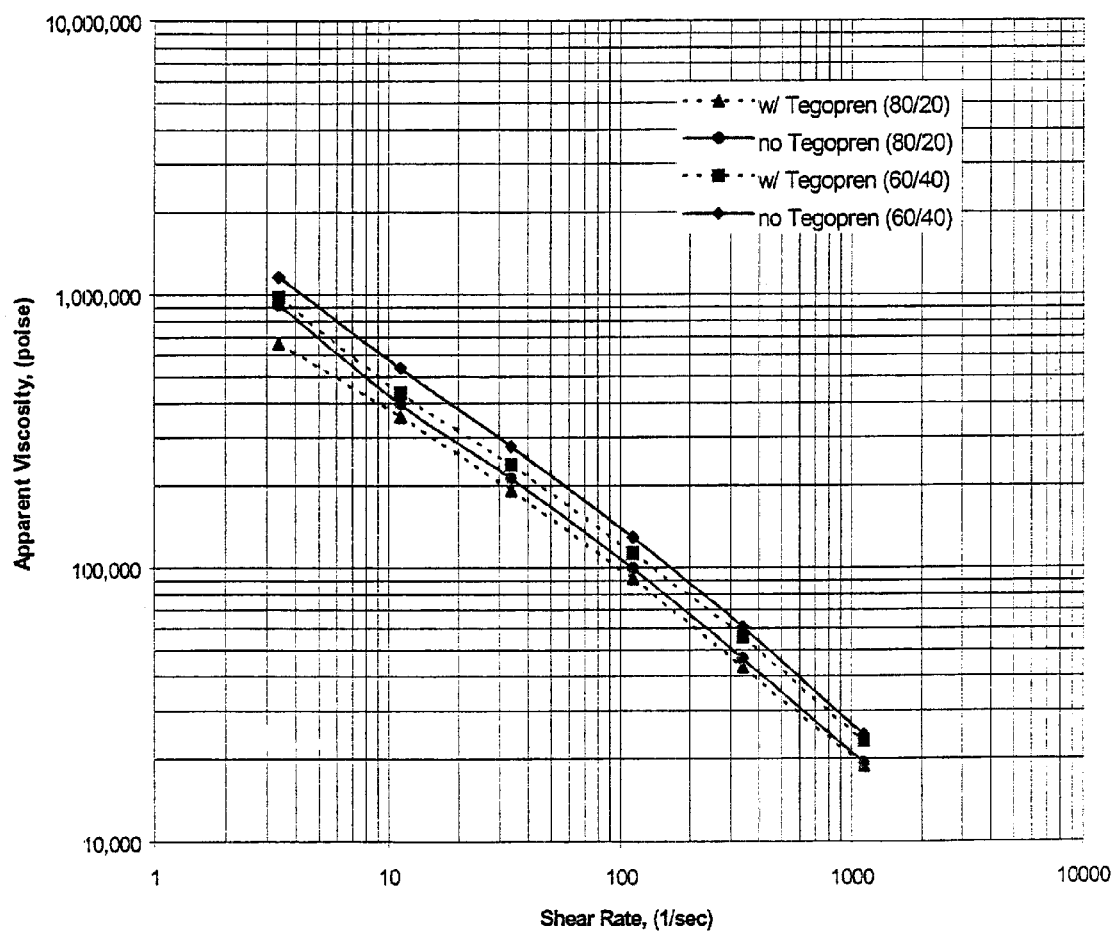
FIG. 4 Apparent viscosity versus shear rate at 210 C

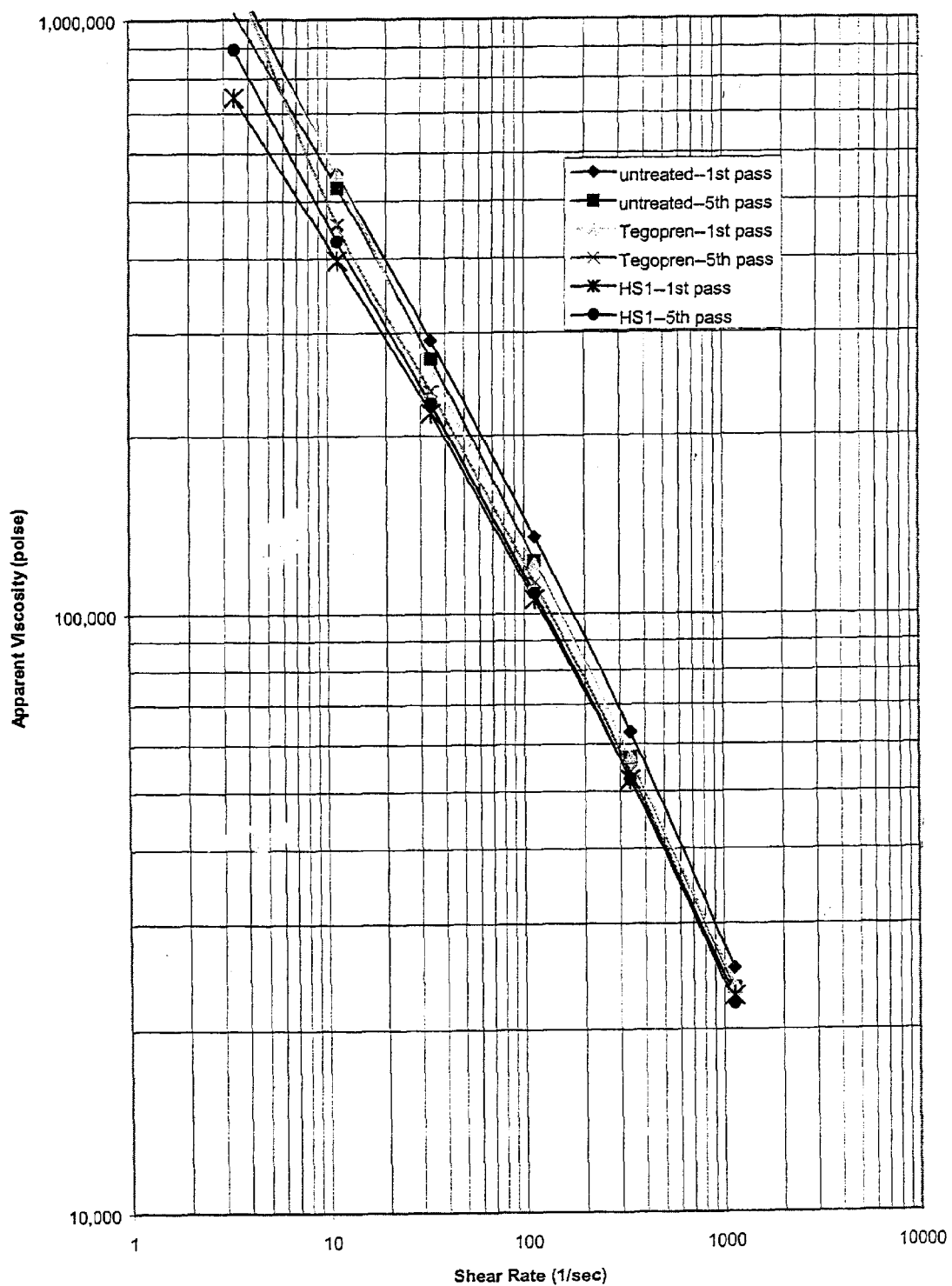
Figure 5 Apparent Viscosity vs. Shear Rate

HIGH FLEXURAL MODULUS AND/OR HIGH HEAT DEFLECTION TEMPERATURE THERMOPLASTIC ELASTOMERS AND METHODS FOR PRODUCING THE SAME

CROSS REFERENCE TO RELATED APPLICATION

This application claims priority, under 35 U.S.C. §119(e), to U.S. Provisional Patent Application Ser. No. 60/211,688, filed Jun. 14, 2000, which is incorporated herein by reference in its entirety.

FIELD OF THE INVENTION

The present invention relates to a thermoplastic composition having a high flexural modulus and/or high heat deflection temperature and a method for producing the same.

BACKGROUND OF THE INVENTION

Thermoplastic elastomers (TPEs) make up a unique class of plastics that combine the key processing properties of thermoplastics with many of the physical properties of thermoset rubbers. TPEs feature many of the positive physical attributes of vulcanized rubbers, such as low compression set and high flexibility, but can be processed using conventional thermoplastic fabrication techniques, like injection molding, extrusion and blow molding. TPEs can be broken down into five major classes. These classes include, but are not limited to, styrene block copolymers (SBCs), thermoplastic olefins or polyolefins (TPOs), thermoplastic vulcanizates (TPVs), thermoplastic polyurethanes, (TPUs), and thermoplastic copolyester elastomers (COPEs). Other types of TPEs include copolyamides and PVC blends. In general, TPOs are produced by blending a thermoplastic like polypropylene with an unvulcanized elastomer like EPDM. TPUs are generally reactor-based TPEs manufactured using either polyester or polyether polyol. COPEs are usually block copolymers comprising alternating hard and soft segments where the soft segment is usually an ether and the hard segment is an ester. TPVs are generally two-phase systems, continuous and dispersed, with a conventional rubber as the dispersed phase and a polyolefin thermoplastic as the continuous phase. The rubber phase in a TPV product is usually vulcanized during the manufacturing process.

Thermoplastic elastomers are useful in a variety of applications, including automotive parts, such as bumpers, dashboards, and other automotive parts where plastics are useful; consumer goods, such as in appliances, electronics and the like; sports equipment; and other areas where plastics are used. A broad range of chemicals have been evaluated as filler treatments or interfacial agents in filled polymers, in particular TPEs, to improve mechanical properties of the polymers. Use of these chemicals has been less than ideal in many cases. For example, certain currently used chemicals yield TPEs that have a low flexural modulus and a low impact resistance, i.e., the TPE is both flexible and brittle. Other commonly used additives result in TPEs with gain in tensile elongation but with little change or even a decrease in flexural modulus such that the resulting composites are more ductile and more flexible. Although the following discussion will focus generally on one class of TPEs, the TPOs, it should be understood by those of ordinary skill in the art that the discussion will apply generally to all classes of TPEs with similar behavioral characteristics.

Still other additives increase the flexural modulus and decrease the impact resistance of the TPOs, i.e., the TPOs become stiff and brittle. In fact, an increase in flexural modulus of TPO generally results in a decrease in impact resistance and vice versa. In many applications, it is desirable to increase the flexural modulus of a TPO while increasing or at least maintaining its impact resistance, i.e., stiff and strong TPOs are useful in many applications. Many chemical additives increase the flexural modulus of TPOs; however, they also decrease the impact resistance of TPOs, and therefore are generally inappropriate as flexural modulus modifying agents. In fact, this decrease in a TPO's impact resistance prevents most of the chemical additives from being useful in many instances.

Another important characteristic of polymers and TPOs, in particular, is the heat deflection temperature. Heat deflection temperature is the temperature at which a standard test bar of the material being tested deflects a specified amount under a specified load. It is desirable that this temperature be high, indicating the ability to withstand high temperatures without deformation.

Therefore, there is a need for a flexural modulus modifying agent for TPOs which does not substantially decrease the impact resistance of TPOs. There is additionally a need for an agent that improves the heat deflection temperature of a polymer.

SUMMARY OF THE INVENTION

One embodiment of the present invention provides a mineral filled TPO (MFTPO) composition and a method for producing such composition, which comprises a polymer mixture, a mineral, and a flexural modulus modifying agent. The flexural modulus modifying agent significantly increases the flexural modulus of the MFTPO (relative to a similar MFTPO composition which lacks the flexural modulus modifying agent) and does not substantially affect the impact resistance of the MFTPO.

The polymer mixture comprises a first polymer, e.g., an elastomer including rubber, and a second polymer, e.g., plastic. Preferably, the first polymer is an elastomer selected from the group consisting of EPDM, EPR, and mixtures thereof. Preferably, the second polymer is a plastic selected from the group consisting of polypropylene including either polypropylene homopolymers or polypropylene copolymers, polyethylene, and mixtures thereof. The amount of first polymer present in the polymeric mixture depends on a particular application of the MFTPO; however, in general, the amount of first polymer in the polymeric mixture is from about 5% to about 55% by weight of the total weight of the MFTPO composition.

Minerals that are useful for the MFTPO composition of the present invention include talc, mica, clay, and mixtures thereof. Preferably, the mineral is talc. Typically, the amount of mineral present in the MFTPO composition of the present invention is from about 5% by weight to about 40% by weight of the total weight of the MFTPO composition.

Flexural modulus modifying agents which are useful in the MFTPO composition of the present invention include polysiloxanes, polyols, including but not limited to polyether polyols, glycols, fatty acids, including but not limited to stearic acid, fatty acid amines, fatty acid amides, alkyl or aryl sulfonates, fatty acid esters, in situ calcium stearate wax and mixtures thereof. Preferably, the flexural modulus modifying agent is a polysiloxane or an alkylsulfonate, more preferably an alkylated polysiloxane. Generally, the flexural modulus modifying agent is present in the amount ranging from about 0.1% by weight to about 5% by weight of the weight of the mineral, more preferably from about 0.25% by weight to about 2% by weight and more preferably from about 0.5% by weight to about 1% by weight, based on the weight of the mineral.

The flexural modulus modifying agent increases flexural modulus of the MFTPO composition by at least about 10% relative to the flexural modulus of a MFTPO composition which lacks the flexural modulus modifying agent, preferably from about 10% to about 80%. Moreover, the difference in impact strength between the MFTPO composition containing the flexural modulus modifying agent and the impact strength of a similar MFTPO composition without the flexural modulus modifying agent is about 10% or less.

Another embodiment of the present invention provides a method for producing the MFTPO described above. The method generally involves admixing the mineral, the flexural modulus modifying agent and the polymer resin mixture (i.e., a polymer mixture) to produce a blended mixture; and producing the MFTPO from the blended mixture. The mineral and the flexural modulus modifying agent may be dispersed in the polymer mixture by processes such as batch mixing in a Banbury type mixer or in a continuous operation such as a compounding extruder, and the like. The conditions corresponding to good compounding practice are generally sufficient. In any event, one skilled in the art can determine when sufficient compounding has been achieved without undue experimentation. In continuous compounding, utilizing twin screw extruders or similar devices, the sequencing can be conveniently accomplished by introducing the ingredients at suitable feedport locations in the extruder. While the flexural modulus modifying agent can be added anytime during the MFTPO production, in one particular aspect of the present invention, it is added to the mineral to produce a surface treated mineral which is then admixed with the polymer resin mixture to produce the blended mixture. The surface treated mineral can be dried, if required, prior to admixing it with the polymer resin mixture. In one particular aspect of the present invention, the MFTPO is produced by an extrusion process, preferably using a twin screw extrusion process. The resulting mixture is then injection molded.

Another embodiment of the present invention provides a mineral filled TPO (MFTPO) composition and a method for producing such composition, which comprises a polymer mixture, a mineral, and a heat deflection temperature modifying agent. The heat deflection temperature modifying agent significantly increases the heat deflection temperature of the MFTPO (relative to a similar MFTPO composition which lacks the heat deflection temperature modifying agent) and does not substantially affect the impact resistance of the MFTPO.

The polymer mixture comprises a first polymer, e.g., an elastomer including rubber, and a second polymer, e.g., plastic. Preferably, the first polymer is an elastomer selected from the group consisting of EPDM, EPR, and mixtures thereof. Preferably, the second polymer is a plastic selected from the group consisting of polypropylene including either polypropylene homopolymers or polypropylene copolymers, polyethylene, and mixtures thereof. The amount of first polymer present in the polymeric mixture depends on a particular application of the MFTPO; however, in general, the amount of first polymer in the polymeric mixture is from about 5% to about 55% by weight of the total weight of the MFTPO composition.

Minerals that are useful for the MFTPO composition of the present invention include talc, mica, clay, and mixtures thereof. Preferably, the mineral is talc. Typically, the amount of mineral present in the MFTPO composition of the present invention is from about 5% by weight to about 40% by weight of the total weight of the MFTPO composition.

Heat deflection temperature modifying agents which are useful in the MFTPO composition of the present invention include polysiloxanes, polyols, including but not limited to polyether polyols, glycols, fatty acids, including but not limited to stearic acids, fatty acid amines, fatty acid amides, alkyl or aryl sulfonates, fatty acid esters, in situ calcium stearate in wax and mixtures thereof. Preferably, the heat deflection temperature modifying agent is a polysiloxane or an alkylsulfonate, more preferably an alkylated polysiloxane. Generally, the heat deflection temperature modifying agent is present in the amount ranging from about 0.1% by weight to about 5% by weight of the total weight of the mineral, more preferably from about 0.25% by weight to about 2% by weight and more preferably from about 0.5% by weight to about 1% by weight, based on the weight of the mineral.

The heat deflection temperature modifying agent increases the heat deflection temperature of the MFTPO composition by at least about 3° C. relative to the heat deflection temperature of a MFTPO composition which lacks the heat deflection temperature modifying agent, preferably by at least about 5° C. and more preferably by at least about 10° C. Preferably, the difference in impact strength between the MFTPO composition containing the heat deflection temperature modifying agent and the impact strength of a similar MFTPO composition without the heat deflection temperature modifying agent is about 10% or less.

Another embodiment of the present invention provides a method for producing the MFTPO described above. The method generally involves admixing the mineral, the heat deflection temperature modifying agent and the polymer resin mixture (i.e., a polymer mixture) to produce a blended mixture; and producing the MFTPO from the blended mixture. The mineral and the heat deflection temperature modifying agent may be dispersed in the polymer mixture by processes such as batch mixing in a Banbury type mixer or in a continuous operation such as a compounding extruder, and the like. The conditions corresponding to good compounding practice are generally sufficient. In any event, one skilled in the art can determine when sufficient compounding has been achieved without undue experimentation. In continuous compounding, utilizing twin screw extruders or similar devices, the sequencing can be conveniently accomplished by introducing the ingredients at suitable feedport locations in the extruder. While the heat deflection temperature modifying agent can be added anytime during the MFTPO production, in one particular aspect of the present invention, it is added to the mineral to produce a surface treated mineral that is then admixed with the polymer resin mixture to produce the blended mixture. The surface treated mineral can be dried, if required, prior to admixing it with the polymer resin mixture. In one particular aspect of the present invention, the MFTPO is produced by an extrusion process, preferably using a twin screw extrusion process. The resulting mixture is then injection molded.

BRIEF DESCRIPTION OF THE DRAWINGS

FIG. 3 is a graph of flexural modulus vs. polypropylene melt-flow for various MFTPO compositions containing talc with Tegopren®, PEG or no surface treatment.

FIG. 4 is a graph of apparent viscosity versus shear rate at 210° C. for MFTPO compositions containing talc with Tegopren® or no surface treatment.

FIG. 5 is a graph of apparent viscosity versus shear rate at 210° C. for MFTPO compositions containing talc with Tegopren®, HS 1 or no surface treatment, demonstrating enhanced process stability

DETAILED DESCRIPTION OF THE INVENTION

Figure 1:
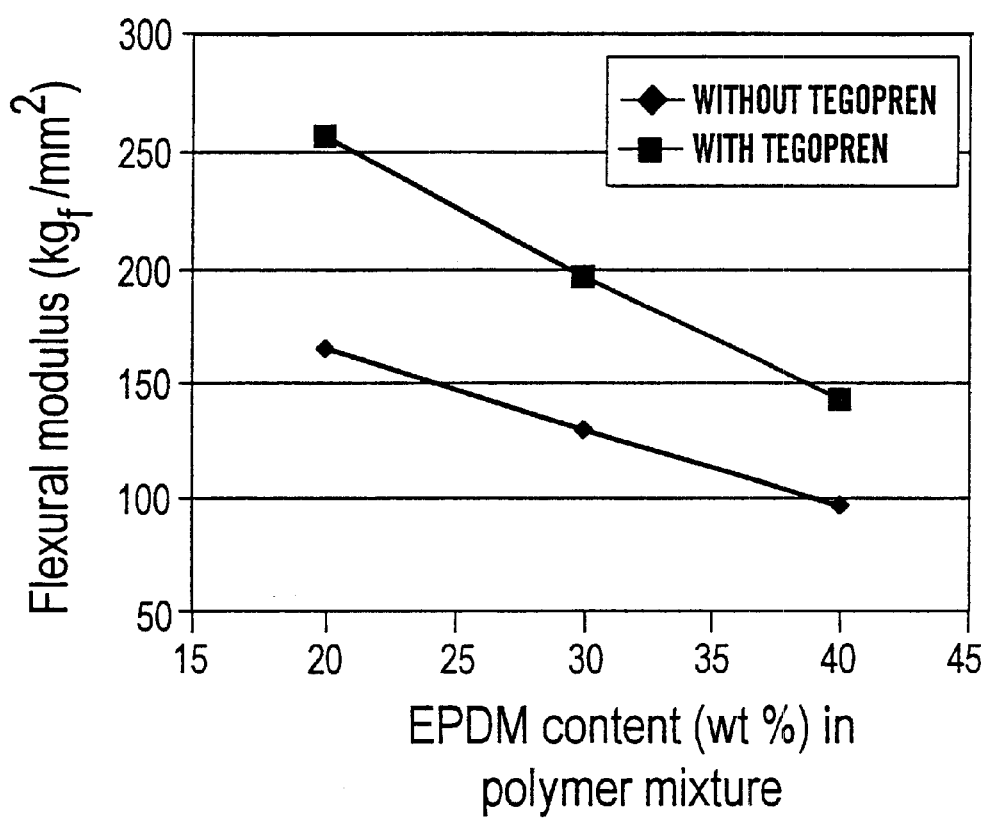
FIG. 1 is a graph of flexural modulus vs. EPDM content of MFTPO compositions at 27% talc loading with and without Tegopren® surface treatment.

At the outset, it should be understood that this invention comprises a polymer mixture to which is added a flexural modulus modifying agent and a mineral. The description which follows describes a preferred embodiment of the invention with respect to certain chemicals which were used in experiments, and various alternative embodiments. It should be readily apparent to those skilled in the art, however, that various other alternative embodiments may be accomplished without departing from the spirit or scope of the invention, especially with TPEs, as generally described above, and other chemical compounds with similar structures and/or known similarities in behavior.

One embodiment of the present invention provides a MFTPO composition and a method for producing such composition comprising a polymer mixture, a filler (i.e., reinforcing pigment or reinforcing mineral), and a flexural modulus modifying agent. As used herein, the term "thermoplastic olefin" (TPO) refers to a specific group of TPEs based upon a polyolefin thermoplastic-. These materials are capable of being repeatedly softened by heat and hardened by cooling.

The polymer mixture of the present invention preferably includes a first polymer and a second polymer. Preferably, the first polymer of the present invention is an elastomer, preferably a non-vulcanized elastomer, including natural and synthetic rubbers. The terms "rubber" and "elastomer" are herein used interchangeably to refer to a family of polymers, typically with a low glass transition temperature ($T_g$), both natural and synthetic, that have the ability to undergo elastic deformations, that is, to stretch and return toward its original shape to some degree in a reversible way and in general have the ability to adsorb impact energy. Exemplary elastomers include natural and synthetic rubbers, such as EPR (ethylene propylene rubber), EPDM (ethylene-propylene-diene terpolymer), POE (polyolefin elastomer, e.g., ethylene-octene elastomer), and mixtures thereof. Preferably, the elastomer of the present invention is selected from the group consisting of EPR, EPDM, and mixtures thereof. Preferably, the polymer mixture of the present invention comprises from about 5% by weight to about 55% by weight of the first polymer, more preferably from about 10% by weight to about 50% by weight, and more preferably from about 20% by weight to about 40% by weight. These weight percentages do not include the mineral filler or the flexural modulus modifying agent.

Preferably, the second polymer of the polymer mixture is a thermoplastic. As used herein, a "thermoplastic" refers to any polymer, including both natural and synthetic, but excluding elastomers, that will soften when exposed to heat and return to its original condition when cooled to room temperature. Generally, at some stage in its manufacture, the thermoplastic is capable of flowing, under heat and pressure, if necessary, into the desired final shape and can be reformed to its original state. Exemplary thermoplastics include polypropylene including either polypropylene homopolymers or polypropylene copolymers, polyethylene, other engineered resins, and mixtures thereof. Preferably, the thermoplastic of the present invention is polypropylene including either polypropylene homopolymers or polypropylene copolymers. Preferably, the polymer mixture of the present invention comprises from about 45% by weight to about 95% by weight of the second polymer, more preferably from about 50% by weight to about 90% by weight, and more preferably from about 60% by weight to about 80% by weight.

The fillers that can be used in the MFTPOs of the present invention are preferably inorganic filler, such as minerals, glass fibers, and aluminum trihydrate (ATH). Preferably, fillers of the present invention are minerals such as talc, kaolin, mica, and mixtures thereof. And the most preferred filler of the present invention is talc. Preferably, MFTPO compositions of the present invention comprise from about 5% by weight to about 50% by weight of the filler, more preferably from about 10% by weight to about 45% by weight, and most preferably from about 20% by weight to about 40% by weight.

The flexural modulus modifying agents of the present invention are additives that increase the flexural modulus of the MFTPO without substantially affecting the impact resistance of the MFTPO. As used herein, unless otherwise stated, the impact resistance refers to resistance to a falling tup, or falling weight, impact test. As used herein, the term "without substantially affecting the impact resistance" refers to less than about 10% difference in impact resistance between a mineral reinforced TPO with and without the flexural modulus modifying agent at 23° C., more preferably less than about 5% difference in impact resistance, and more preferably less than about 1% difference in impact resistance. The flexural modulus modifying agents of the present invention increase the flexural modulus of the MFTPO by at least about 10% relative to the similar corresponding MFTPO without the flexural modulus modifying agent, preferably from about 10% to about 60%, more preferably at least about 30%, and most preferably at least about 50%. Exemplary flexural modulus modifying agents include polysiloxanes, such as Tegopren® 6875 (alkylester polydimethylsilioxane), Tegopren® 6814 (alkyl polymethylsiloxane) and Dow Corning 1107® (methylhydrogen polysiloxane); polyols including, but not limited to, polyether polyols such as Dowfax WP130; fatty acid amines; fatty acid amides; glycols such as polyethylene glycol (e.g., PEG-200®); fatty acid esters; sodium alkane sulfonates, such as Clariant Corp.® Hostastat HS 1; lubricant packages, such as RHEOLUB 1800® (which comprises fatty acid ester, hydrocarbon wax, calcium stearate and stearic acid) and mixtures thereof. Preferably, the flexural modulus modifying agent is polysiloxane (such as Tegopren® brand polysiloxanes), Dowfax WP 130, PEG-200®, RHEOLUB 1800®, PS-1650®, HS 1, PE-18®, fatty acid amines, fatty acid amides, or mixtures thereof. More preferably, the flexural modulus modifying agent is Tegopren®, HS 1, fatty acid amines, fatty acid amides, or mixtures thereof. The amount of flexural modulus modifying agent in the MFTPO is set forth as a weight percentage of the mineral filler in the MFTPO. Preferably, flexural modulus modifying agent in the MFTPO compositions of the present invention is present in amounts from about 0.1% by weight to about 5% by weight, more preferably from about 0.25% by weight to about 2% by weight, and most preferably from about 0.5% by weight to about 1% by weight, based on the weight of the mineral filler.

Another embodiment of the present invention provides a MFTPO composition and a method for producing such composition comprising a polymer mixture, a filler (i.e., reinforcing pigment or reinforcing mineral), and a heat deflection temperature modifying agent. As used herein, the term "thermoplastic olefin" (TPO) refers to a polymer that is capable of being repeatedly softened by heat and hardened by cooling.

The polymer mixture of the present invention preferably includes a first polymer and a second polymer. Preferably, the first polymer of the present invention is an elastomer, preferably a non-vulcanized elastomer, including natural and synthetic rubbers. The terms "rubber" and "elastomer" are herein used interchangeably to refer to a family of polymers with a low glass transition temperature ($T_g$), both natural and synthetic, that have the ability to undergo elastic deformations, that is, to stretch and return toward its original shape to some degree in a reversible way and in general have the ability to adsorb impact energy Exemplary elastomers include natural and synthetic rubbers, EPR (ethylene propylene rubber), EPDM (ethylene-propylene-diene terpolymer), POE (polyolefin elastomer, e.g., ethylene-octene elastomer), and mixtures thereof. Preferably, the elastomer of the present invention is selected from the group consisting of EPR, EPDM, and mixtures thereof. Preferably, the polymer mixture of the present invention comprises from about 5% by weight to about 55% by weight of the first polymer, more preferably from about 10% by weight to about 50% by weight, and more preferably from about 10% by weight to about 40% by weight. These weight percentages do not include the mineral filler or the heat deflection temperature modifying agent.

Preferably, the second polymer of the polymer mixture is a thermoplastic. As used herein, a "thermoplastic" refers to any polymer, including both natural and synthetic, but excluding elastomers that will soften when exposed to heat and return to its original condition when cooled to room temperature. Generally, at some stage in its manufacture, the thermoplastic is capable of flowing, under heat and pressure, if necessary, into the desired final shape. Exemplary thermoplastics include polypropylene including either polypropylene homopolymers or polypropylene copolymers, polyethylene, other engineered resins, and mixtures thereof. Preferably, the thermoplastic of the present invention is polypropylene including either polypropylene homopolymers or polypropylene copolymers. Preferably, the polymer mixture of the present invention comprises from about 45% by weight to about 95% by weight of the second polymer, more preferably from about 50% by weight to about 90% by weight, and more preferably from about 60% by weight to about 80% by weight.

The fillers that can be used in the MFTPOs of the present invention are preferably inorganic filler, such as minerals, glass fibers, and aluminum trihydrate (ATH). Preferably, fillers of the present invention are minerals such as talc, kaolin, mica, and mixtures thereof. And the most preferred filler of the present invention is talc. Preferably, MFTPO compositions of the present invention comprise from about 5% by weight to about 50% by weight of the filler, more preferably from about 10% by weight to about 45% by weight, and most preferably from about 20% by weight to about 40% by weight.

The heat deflection temperature modifying agents of the present invention are additives which increase the heat deflection temperature of the MFTPO, preferably without substantially affecting the impact resistance of the MFTPO. As used herein, unless otherwise stated, the impact resistance refers to resistance to a falling tup, or falling weight, impact test. As used herein, the term "without substantially affecting the impact resistance" refers to less than about 10% difference in impact resistance between a mineral reinforced TPO with and without the heat deflection temperature modifying agent at 23° C., more preferably less than about 5% difference in impact resistance, and more preferably less than about 1% difference in impact resistance. The heat deflection temperature modifying agents of the present invention increase the heat deflection temperature of the MFTPO by at least about 3° C. relative to the similar corresponding MFTPO without the heat deflection temperature modifying agent, preferably at least about 5° C., more preferably at least about 10° C. Exemplary heat deflection temperature modifying agents include polysiloxanes, such as Tegopren® 6875 (alkylester polydimethylsilioxane), Tegopren® 6814 (alkyl polymethylsiloxane) and Dow Corning 1107® (methylhydrogen polysiloxane); polyols including but not limited to polyether polyols such as Dowfax WP130; fatty acid amines; fatty acid amides; polyethylene glycol, such as PEG-200®; fatty acid esters; sodium alkane sulfonates, such as Clariant Corp.® Hostastat HS 1; lubricant packages, such as RHEOLUB 1800®, (which comprises fatty acid ester, hydrocarbon wax, calcium stearate and stearic acid) and mixtures thereof. Preferably, the heat deflection temperature modifying agent is polysiloxane (such as Tegopren® brand polysiloxanes), Dowfax WP 130, PEG-200®, RHEOLUB 1800®, PS-1650®, HS 1, PE-18®, fatty acid amines, fatty acid amides, or mixtures thereof. More preferably, the heat deflection temperature modifying agent is Tegopren®, HS 1, fatty acid amines, fatty acid amides, or mixtures thereof. The amount of heat deflection temperature modifying agent in the MFTPO is set forth as a weight percentage of the mineral filler in the MFTPO. Preferably, the heat deflection temperature modifying agent in the MFTPO compositions of the present invention is present in amounts from about 0.1% by weight to about 5% by weight, more preferably from about 0.25% by weight to about 2% by weight, and more preferably from about 0.5% by weight to about 1% by weight, based on the weight of the mineral filler.

It has been found that the heat deflecting temperature modifying agent increases the heat deflection temperature of mineral reinforced TPO. The heat deflection temperature is the temperature at which a standard test bar of the MFTPO deflects a specified amount under a specified load. It can be measured in accordance with ASTM D648-96 "Standard Test Methods For Deflection Temperature of Plastic Under Flexural Load" or International Standard ISO 75-1:1993 (E) "Plastics-Determination of Temperature of Deflection Under Load". The heat deflection temperature is an indicator in the design of parts. MFTPO is selected to support the design load without excessive distortion at elevated temperatures encountered in the use application. Increasing the heat deflection temperature using a heat deflection temperature modifying agent will allow the material in questions to perform in applications where higher service temperatures are anticipated. Preferably the heat deflection temperature is increased at least 3° C., more preferably at least 5° C. and more preferably at least 10° C. The ratio of EPDM to polypropylene can affect the heat deflection temperature.

Although the following discussion is directed to flexural modulus modifying agents, it will be appreciated that the discussion also applies to corresponding heat deflection temperature modifying agents. Surprising and unexpectedly, it has been found that the addition of a flexural modulus modifying agent also improves the color of MFTPOs. By "improved color," it is meant that the MFTPO's color is brighter (i.e., whiter or lighter) than a corresponding MFTPO which does not contain the flexural modulus modifying agent. In the "Hunter Lab" scale, the shift in brightness (measured as ΔE) is typically about 2 or higher. Preferably, the flexural modulus modifying agent increase ΔE of at least about 3. And more preferably the flexural modulus modifying agent increase ΔE to from about 3 to about 9. Moreover, MFTPOs of the present invention may have better UV stability.

Other adjuvants which can be employed in the compositions of the present invention include curing agents; flame retardant additives; blowing agents; nucleating agents for blown systems; lubricants; UV stabilizers; dyes and colorants; voltage stabilizers; metal deactivators; and traditional coupling agents. These adjuvants can be used in amounts designed to provide the intended effect in the resulting composition. The total amount of adjuvants can vary widely, e.g., from 0 to about 60 weight percent based on the total weight of the reinforced, filled thermoplastic composition. Where the adjuvants are compounds which may interfere with a performance of the flexural modulus modifying agent; they should be added subsequent to the addition of the flexural modulus modifying agent. If there is no significant interaction to inhibit the performance of the flexural modulus modifying agent, the adjuvants may be added at any suitable time.

In an embodiment of the process of the present invention, the flexural modulus modifying agent is applied to the surface of the filler prior to compounding with the polymers. However, other means of incorporating the flexural modulus modifying agents can be employed and sometime may be preferred, both from a manufacturing and from a cost viewpoint. For example, the flexural modulus modifying agents may be admixed with the filler-polymer mixture at the time of compounding, i.e., integral blending; the flexural modulus modifying agents may be admixed with the polymers prior to adding the filler to the resulting mixture; or by any other procedure established in the art. A particularly preferred process is to pre-treat the filler with an emulsion containing the flexural modulus modifying agent (i.e., admixing the filler with the flexural modulus modifying agent), drying the pre-treated filler and incorporating the flexural modulus modifying agent-treated filler into the polymer mixture, e.g., using a twin-screw extruder, and injection molding the resulting mixture.

Without wishing to be bound by any theory, there is some evidence that the flexural modulus modifying agent increases the thickness of the skin in an injection molded part. The skin refers to the zone closest to the wall of the mold. The center section or zone of an injected molded part is referred to as the core. The proposed theory regarding the change in the thickness of the skin relative to the core is based upon the change in flexural modulus upon removal of 10% of the thickness of a test specimen. It was observed that the flexural modulus of talc-reinforced TPO decreased 36% compared to only 10% for the talc-reinforced TPO containing the flexural modulus modifying agent. In addition, scanning electron microscopic examination of the molded surface revealed better wetting of the talc by the TPO at the surface of the molded part in the system with the flexural modulus modifying agent.

Additional objects, advantages, and novel features of this invention will become apparent to those skilled in the art upon examination of the following examples thereof, which are not intended to be limiting.

EXAMPLES

In the following examples, the following definitions are applicable: talc 710=Cimpact® 710 talc, talc 610= Cimpact® 610 talc, and talc 674=Nicron® 674, all available from Luzenac America, Inc. Unless otherwise noted, talc is treated with flexural modulus modifying agent (e.g., about 2.2% of Tegopren® 6875-45 emulsion, which contains 45% Tegopren® 6875 and 55% water and therefore corresponds to approximately 1% by weight of the polysiloxane relative to the talc) in a high-intensity Papenmeier mixer, dried, compounded with the resin mixture (e.g., polypropylene (PP) and EPDM rubber) in a counter-rotating twin-screw Leistritz extruder. The compounds were injection molded, and mechanical properties measured.

Example 1

This example illustrates the effect of Tegopren® on flexural modulus and impact strength of EPDM based TPOs.

The talc used in this Example was a commercial product from Luzenac America, Inc. (Cimpact 610). It is a 6 hegman product with a mps of 2.84 μm and a $D_{85}$ of 6.10 μm. The surface treatment was 45% non-ionic emulsion of alkyl ester polydimethylsiloxane (Tegopren® 6875-45) from Goldschmidt Chemical Corporation.

Talc was surface treated with an alkyl/ester-modified siloxane emulsion (e.g., Tegopren® 6875-45) in the high-intensity Papenmeier mixer and dried. The resulting product was compounded at about 25% in a physical mixture of a PP homopolymer and EPDM rubber in a counter-rotating twin screw extruder. The resulting mixture was injection molded.

The polymer mixtures are given in the following Table 1A. The PP and EPDM were dry blended and fed to the extruder from the resin hopper. The talc was metered from a second feeder into the rear feed port.

TABLE 1A

Polymer Mixtures

| Ratio of PP/EPDM | Component | Manufacturer/Product | Weight % |
|---|---|---|---|
| 80/20 | PP homopolymer | Amoco/1046 PP | 80 |
|  | EPDM | DSM/Keltan E801 pellets | 20 |
| 60/40 | PP homopolymer | Amoco/1046 PP | 60 |
|  | EPDM | DSM/Keltan E801 pellets | 40 |

As shown in Table 1B, the Tegopren® surface treatment results in a significant increase (i.e., 56% and 47.4%) in the flexural modulus without any significant adverse effect on impact strength in talc-reinforced EPDM based TPOs. The significant increase in flexural modulus is also illustrated in FIG. 1 for 80/20, 70/30 and 60/40 polymer mixtures.

TABLE 1B

The Effect of Tegopren ® Surface Treatment on the Mechanical Properties of Talc-Reinforced PP/EPDM TPO

| ID |  | 4744 | 4740 | 4742 | 4743 |
|---|---|---|---|---|---|
| Ratio of PP/EPDM |  | 80/20 | 80/20 | 60/40 | 60/40 |
| Talc Conc., % |  | 27.1 | 27.1 | 27.9 | 26.8 |
| Tegopren ® 6875 Conc. % |  | 0 | 1.0 | 0 | 1.0 |
| Flex Modulus, $kg_f/mm^2$ | Mn | 165 | 257 | 97 | 143 |
| (ISO 178) | Std | 1.83 | 4.17 | 1.87 | 4.20 |
| Izod Impact, $kJ/m^2$ | Mn | 18.0 | 18.7 | 69.0 | 72.6 |
| (ISO 180) | Std | 0.72 | 2.16 | 3.59 | 1.44 |
| Falling Tup Impact @ 23, J | Mn | 13.2 | 15.6 | 13.2 | 13.5 |
| (ASTM D5628) | Std | 1.65 | 0.38 | 0.19 | 0.45 |

Abbreviations:
Mn = mean;
Std = standard deviation.

Another important property of TPOs is the melt viscosity or rheology of the TPO. Table 1C numerically illustrates the effect of Tegopren® on the melt viscosity of mineral filled TPOs, made according to the present invention. The compounds exhibit pseudoplastic behavior and can be characterized as a power law fluid in the range encountered in extrusion and injection molding. The equation for a power law fluid is as follows:

$$\eta = \eta° |\dot\gamma/\dot\gamma°|^{n-1}$$

where:

$\eta°$=non-Newtonian viscosity of the compound in the standard state defined by the shear rate $\dot\gamma°$ n=flow index of the compound.

FIG. 4 graphically depicts the results of this example.

TABLE 1C

Effect of Tegopren ® on Melt Viscosity at 210° C.

| Shear Rate, sec⁻¹ | | 3.38 | 11.26 | 33.78 | 112.6 | 337.8 | 1126 |
|---|---|---|---|---|---|---|---|
| ID | Teg? | PP/EPDM | | Apparent Viscosity, $\eta \times 10^{-3}$, poise | | | |
| 4841 | Yes | 80/20 | 662 | 357 | 192 | 91.3 | 43.2 | 18.9 |
| 4842 | No | 80/20 | 913 | 397 | 212 | 99.3 | 46.3 | 19.3 |
| 4922 | Yes | 60/40 | 980 | 437 | 238 | 113.2 | 55.6 | 23.2 |
| 4921 | No | 60/40 | 1158 | 536 | 278 | 129.1 | 60.6 | 24.4 |

Note:
L/D = 40 for capillary; 2) data is not corrected using the Rabinowitsch relationship or for entrance effects.

As is shown above, the use of Tegopren® results in a slight reduction in the melt viscosity at higher shear rates, which can be beneficial in processing, such as injection molding. Thus, the use of Tegopren® does not adversely affect the melt viscosity.

Example 2

Figure 2:
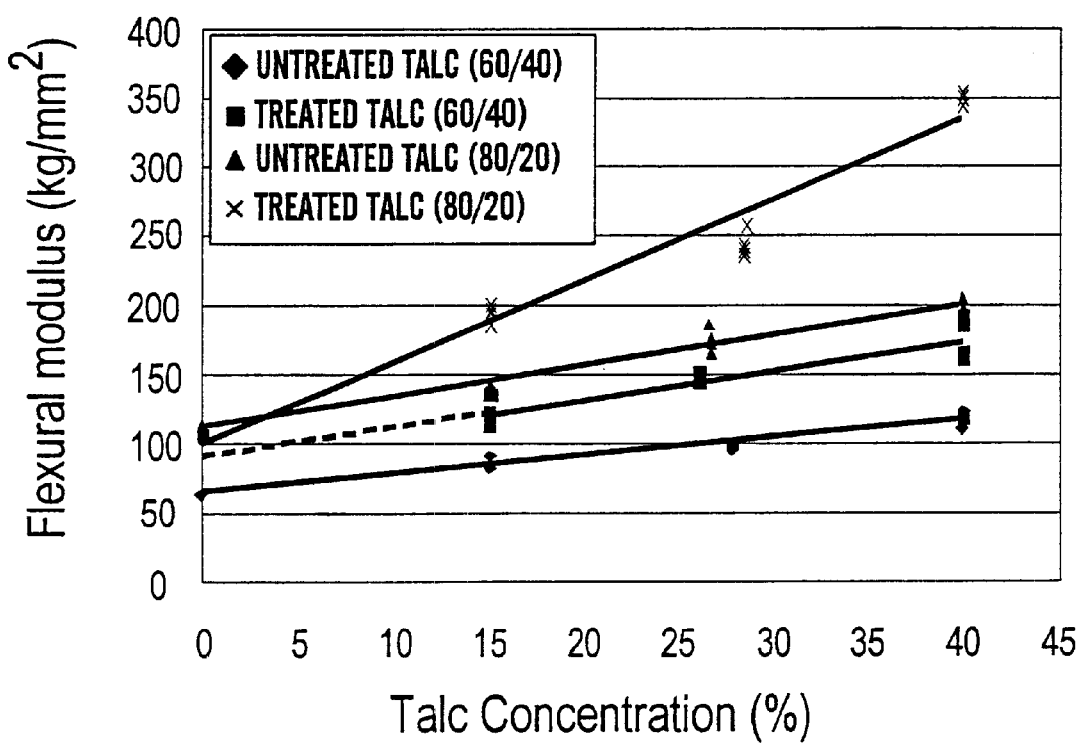
FIG. 2 is a graph showing the effect of talc concentration on MFTPO's flexural modulus.

This example illustrates the effect over a range of concentrations of talc from about 15% to about 40% at two different ratios of PP to EPDM (See also, FIG. 2).

As shown in Tables 2A and 2B, Tegopren® increases the flexural modulus of TPO's containing a wide range of talc (see also FIG. 2).

TABLE 2A

Mechanical Testing on Talc-Reinforced 60/40 PP/EPDM TPO

| ID | 4819 | 4817 | 4742 | 4822 | 4824 | 4825 |
|---|---|---|---|---|---|---|
| PP/EPDM | 60/40 | 60/40 | 60/40 | 60/40 | 60/40 | 60/40 |
| Talc Conc. | 15 | 15 | 27.9 | 26.12 | 40 | 40 |
| Tegopren ® 6875-45 Conc., % | 0 | 2.2 | 0 | 2.2 | 0 | 2.2 |
| Flex Modulus, kg$_f$/mm² (ISO 178) | | | | | | |
| Mn | 90 | 120 | 97 | 147 | 118 | 161 |
| Std | 0.57 | 2.09 | 1.87 | 2.38 | 2.38 | 4.30 |
| Tensile Stress, kg$_f$/mm² (ISO 527-2/1A/50) | | | | | | |
| Mn | 1.70 | 1.72 | 1.93* | 1.75 | 1.85 | 1.77 |
| Std | 0.027 | 0.021 | 0.011* | 0.014 | 0.018 | 0.029 |
| Izod Impact, kJ/m² (ISO 180/1A) | | | | | | |
| Mn | 74.0 | 72.6 | 69.2 | 69.3 | 65.4 | 64.7 |
| Std | 1.44 | 1.44 | 3.45 | 1.23 | 2.87 | .44 |
| Falling Tup Impact, J (ASTM D5628) | | | | | | |
| Mn | 14.0 | 14.5 | 13.2 | 13.3 | 14.8 | 12.9 |

TABLE 2A-continued

Mechanical Testing on Talc-Reinforced 60/40 PP/EPDM TPO

| ID | 4819 | 4817 | 4742 | 4822 | 4824 | 4825 |
|---|---|---|---|---|---|---|
| Std | 0.22 | 0.41 | 0.19 | 0.20 | 0.35 | 0.20 |
| Falling Tup Impact, J, −20° C. (ASTM D5628) | | | | | | |
| Mn | 18.2 | 18.4 | 16.9* | 17.9 | 15.3 | 12.8 |
| Std | 0.35 | 0.43 | 0.42* | 0.50 | 0.99 | 1.44 |
| Falling Tup Impact, J, −40° C. (ASTM D5628) | | | | | | |
| Mn | 20.2 | 20.8 | 18.3* | 15.9● | 3.6 | 1.5 |
| Std | 0.66 | 0.69 | 0.38* | 1.98● | 1.91 | 0.19 |

*Denotes data from sample 4863 (28.82% talc loading)
●Denotes data from sample 4862 (27.82% talc loading)

TABLE 2B

Mechanical Testing on Talc-Reinforced 80/20 PP/EPDM TPO

| ID | 4813 | 4815 | 4828 | 4831 | 4814 | 4816 |
|---|---|---|---|---|---|---|
| PP/EPDM | 80/20 | 80/20 | 80/20 | 80/20 | 80/20 | 80/20 |
| Talc Conc. | 15 | 15 | 26.7 | 28.6 | 40 | 40.36 |
| Tegopren ® 6875-45 Conc., % | 0 | 2.2 | 0 | 2.2 | 0 | 2.2 |
| Flex Modulus, kg$_f$/mm² (ISO 178) | | | | | | |
| Mn | 139 | 195 | 176 | 239 | 195 | 351 |
| Std | 2.12 | 3.31 | 8.69 | 1.89 | 3.32 | 3.16 |
| Tensile Stress, kg$_f$/mm² (ISO 527-2/1A/50) | | | | | | |
| Mn | 2.53 | 2.57 | 2.60 | 2.58 | 2.71 | 2.58 |
| Std | 0.019 | 0.035 | 0.014 | 0.012 | 0.014 | 0.009 |
| Izod Impact, kJ/m² (ISO 180/1A) | | | | | | |
| Mn | 23.0 | 15.8 | 18.0 | 16.5 | 11.9 | 10.8 |
| Std | 2.16 | 1.94 | 1.44 | 1.44 | 0.72 | 0.72 |
| Falling Tup Impact, J (ASTM D5628) | | | | | | |
| Mn | 16.2 | 14.9 | 11.6 | 14.5 | 10.2 | 12.0 |
| Std | 0.35 | 0.31 | 1.36 | 0.47 | 0.54 | 0.95 |
| Falling Tup Impact, J, −20° C. (ASTM D5628) | | | | | | |
| Mn | 4.8 | 11.1** | 2.5 | 1.0 | 1.4 | 1.5 |
| Std | 0.88 | 3.85 | 0.80 | 0.54 | 0.18 | 0.41 |
| Falling Tup Impact, J, −40° C. (ASTM D5628) | | | | | | |
| Mn | 1.7 | 2.2 | 1.2 | 0.8 | 0.9 | 1.0 |
| Std | 0.42 | 0.45 | 0.31 | 0.14 | 0.12 | 0.19 |

**Point appears to be an outlier

Example 3

This example illustrates that Tegopren® also increases the flexural modulus without any significant adverse effect on impact strength of EPR based TPOs.

TPOs similar to that of Example 1 were prepared by substituting EPR for EPDM and mixing the MFTPO in a BR Banbury mixer. As shown in Table 3, the Tegopren® surface treatment results in a significant increase in the flexural modulus without any significant adverse effect on impact strength in talc-reinforced EPR based TPOs.

TABLE 3

Mechanical Properties of PP/EPR TPO

| ID | | 4837 | 4832 | 4833 | 4836 | 4835 | 4834 |
|---|---|---|---|---|---|---|---|
| PP/EPR Ratio | | | 80/20 | | | 60/40 | |
| Talc Conc. | | 0 | 27 | 27 | 0 | 27 | 27 |
| Tegopren ® 6875-45 Conc. on talc, % | | 0 | 0 | 2.2 | 0 | 0 | 2.2 |
| Flex Modulus, kg$_f$/mm² (ISO 178) | | | | | | | |
| | Mn | 135 | 227 | 254 | 88 | 137 | 153 |
| | Std | 1.50 | 5.22 | 3.01 | 3.48 | 5.20 | 2.15 |
| Tensile Yield Stress, kg$_f$/mm (ISO 527-2/1A/50) | | | | | | | |
| | Mn | 2.56 | 2.45 | 2.52 | 1.55 | 1.45 | 1.51 |
| | Std | 0.02 | 0.06 | 0.03 | 0.04 | 0.01 | 0.00 |
| Yield Strain*, % (ISO 527-2/1A/50) | | | | | | | |
| | Mn | 12.8 | 8.3 | 7.4 | 12.9 | 9.1 | 8.0 |
| | Std | 0.55 | 0.56 | 0.19 | 0.78 | 0.67 | 0.80 |
| Izod Impact, kJ/m² (ISO 180/1A) | | | | | | | |
| | Mn | 34.5 | 18.0 | 19.4 | 60.4 | 64.0 | 58.9 |
| | Std | 1.44 | 2.16 | 1.44 | 1.44 | 2.16 | 2.87 |
| Falling Tup Impact, J @ 23° C. (ASTM D5628) | | | | | | | |
| | Mn | 15.1 | 14.2 | 14.1 | 11.5 | 12.2 | 11.8 |
| | Std | 0.20 | 1.40 | 0.35 | 0.19 | 0.12 | 0.14 |
| Falling Tup Impact, J @ −20° C. (ASTM D5628) | | | | | | | |
| | Mn | 19.1 | 7.1 | 5.8 | 15.3 | 16.7 | 17.0 |
| | Std | 0.34 | 1.91 | 3.28 | 0.49 | 0.71 | 0.42 |
| Falling Tup Impact J @ −40° C. (ASTM D5628) | | | | | | | |
| | Mn | 19.2 | 3.7 | 4.0 | 16.8 | 18.1 | 18.2 |
| | Std | 2.79 | 0.94 | 2.13 | 0.65 | 0.37 | 0.77 |
| Color (Hunter "Lab") | | | | | | | |
| | L | 61.28 | 64.81 | 72.36 | 67.83 | 67.64 | 74.30 |
| | a | −0.50 | −0.13 | −0.47 | −0.41 | 0.29 | −0.37 |
| | b | 2.57 | 2.20 | 2.94 | 2.30 | 3.75 | 3.47 |

Mn = mean; Std = standard deviation.
Note:
molded color measured with Minolta CR-300.
*Yield strain are only relative as extensiometer was not used.

Example 4

This example illustrates that talc may be pre-treated with a flexural modulus modifying agent or the flexural modulus modifying agent may be added in situ.

Pre-treatment was conducted using standard conditions. For the in situ case, the PP pellets were coated with the Tegopren® emulsion. The coated polypropylene pellets were dried at 60° C. for 3 hours before mixing with the EPDM pellets. The mixture was then compounded with untreated Cimpact 610® talc in the counter-rotating twin-screw Leistritz extruder. The level of Tegopren® was based on an estimated 30% talc loading with a concentration of approximately 1% active ingredient. This corresponds to about 1.2% by weight of the emulsion on the PP pellets for the 80/20 blend and about 1.6% by weight for 60/40 blend.

The mechanical properties for in situ and pre-treated TPOs are shown in Tables 4A and 4B for 80/20 blend and 60/40 blend, respectively.

TABLE 4A

In Situ vs. Pretreatment on Mechanical Properties of 80/20 Blend

| ID | | 4786 | 4792 | 4793 | 4788 | 4787 |
|---|---|---|---|---|---|---|
| Talc Conc. | | 0 | 0 | 24.2 | 28 | 28.8 |
| Type of Treatment | | none | in situ | none | pre | in-situ |
| Tegopren ® 6875-45 Conc. on PP, % | | 0 | 1.2 | 0 | 0 | 1.2 |
| Tegopren ® 6875-45 Conc. on talc, % | | — | — | 0 | 2.2 | 0 |
| Flex Modulus, kg$_f$/mm² (ISO 178) | Mn | 111 | 105 | 146 | 236 | 232 |
| | Std | 2.52 | 0.43 | 1.51 | 3.99 | 4.27 |
| Izod Impact, kJ/m² (ISO 180/1A) | Mn | 10.1 | 11.5 | 15.8 | 18.7 | 13.7 |
| | Std | 1.44 | 1.44 | 0.72 | 1.44 | 0.72 |
| Falling Tup Impact, J @ 23° C. (ASTM D5628) | Mn | 16.0 | 15.3 | 12.8 | 14.8 | 13.9 |
| | Std | 0.54 | 0.18 | 1.63 | 0.53 | 0.46 |

Mn = mean;
Std = standard deviation.

TABLE 4B

In Situ vs. Pretreatment on Mechanical Properties of 60/40 Blend

| ID | | 4821 | 4823 | 4822 |
|---|---|---|---|---|
| Talc Conc., % | | 0 | 28.5 | 26.1 |
| Type of Treatment | | none | in situ | pre |
| Tegopren ® 6875-45 Conc. on PP, % | | 0 | 1.6 | 0 |
| Tegopren ® 6875-45 Conc. on talc, % | | 0 | 0 | 2.2 |
| Flex Modulus, kg$_f$/mm² (ISO 178) | Mn | 64 | 153 | 147 |
| | Std | 1.35 | 2.60 | 2.38 |
| Tensile Yield Stress, kg$_f$/mm (ISO 527-2/1A/50) | Mn | 1.58 | 1.86 | 1.75 |
| | Std | 0.01 | 0.02 | 0.01 |
| Yield Strain, % (ISO 527-21/1A/50)) | Mn | 18.7 | 14.4 | 13.6 |
| | Std | 1.14 | 0.64 | 0.65 |
| Ultimate Elongation, % (ISO 527-2/1A/50) | Mn | — | 84 | 611 |
| | Std | — | 30 | 19 |
| Izod Impact, kJ/m² (ISO 180/1A) | Mn | 73.3 | 71.8 | 69.3 |
| | Std | 0.57 | 1.23 | 1.23 |
| Falling Tup Impact, J @ 23° C. (ASTM D5628) | Mn | 12.8 | 13.1 | 13.3 |
| | Std | 0.05 | 0.22 | 0.20 |
| Falling Tup Impact, J @ −20° C. (ASTM D5628) | Mn | 17.5 | 17.5 | 17.9 |
| | Std | 0.35 | 0.96 | 0.50 |
| Falling Tup Impact, J @ −40° C. (ASTM D5628) | Mn | 21.0 | 9.6 | 8.9 |
| | Std | 0.49 | 1.42 | 1.87 |

Mn = mean;
Std = standard deviation.
Crosshead speed 50 mm/min in tensile test.

In general, as with pre-treated talc, TPOs produced by the in situ addition of Tegopren® have a significantly higher flexural modulus than TPOs produced without Tegopren®. The increase in flexural modulus is approximately equivalent to the TPOs produced from a Tegopren® pre-treated talc.

Example 5

This example illustrates that other polysiloxanes are also useful flexural modulus modifying agents.

Two other polysiloxanes, Tegopren® 6814 and Dow Corning 1107®, were evaluated as possible flexural modulus modifying agents. Tegopren® 6814 has a similar structure to Tegopren® 6875 but does not have a polyester pendant group. Dow Corning 1107® is a methyl hydrogen polysiloxane.

Similar to Example 1, the talc was surface-treated in the high-intensity Papenmeier. To improve coating uniformity, both the mixer and the talc were preheated to approximately 80° C. The treatment level was 1%. The treated talc was compounded with an 80/20 mixture of PP and EPDM in the counter-rotating twin-screw Leistritz extruder. The compounds were injection molded and tested according to ASTM and ISO methods. The results of mechanical testing on talc-reinforced 80/20 PP/EPDM TPO are shown in Table 5.

TABLE 5

Mechanical Properties of 80/20 Blend

| ID | | 4828 | 4829 | 4831 | 4831 | Composite* |
|---|---|---|---|---|---|---|
| Surface Treatment[1] | | none | 6814 | 1107 | 6875-45 | 6875-45 |
| Talc Conc. % | | 26.7 | 25.5 | 28.0 | 28.6 | 26–28 |
| Flex Modulus, kg$_f$/mm$^2$ | Mn | 176 | 244 | 239 | 239 | 238** |
| (ISO 178) | Std | 8.69 | 2.83 | 1.75 | 1.89 | 19.6 |
| Tensile Yield Stress, kg$_f$/mm | Mn | 2.60 | 2.65 | 2.67 | 2.58 | |
| (ISO 527-2/1A/50) | Std | 0.014 | 0.005 | 0.012 | 0.012 | |
| Yield Strain, % | Mn | 9.89 | 8.70 | 7.71 | 6.69 | |
| (ISO 527-2/1A/500 | Std | 0.24 | 0.22 | 0.12 | 0.17 | |
| Ultimate Elongation, % | Mn | 24.4 | 21.6 | 17.8 | 15.4 | |
| (ISO 527-2/1A/50) | Std | 1.71 | 4.56 | 0.67 | 2.43 | |
| Izod Impact, kJ/m$^2$ | Mn | 18.0 | 20.1 | 13.7 | 16.5 | 17.4 |
| (ISO 180/1A) | Std | 1.44 | 1.44 | 1.44 | 1.44 | 5.1 |
| Falling Tup Impact, | Mn | 11.6 | 15.4 | 15.2 | 14.5 | 15.0 |
| J @ 23° C. | Std | 1.36 | 0.62 | 0.31 | 0.47 | 0.85 |
| (ASTM D5628) | | | | | | |
| Falling Tup Impact, | Mn | 2.07 | 2.33 | 1.47 | 1.00 | |
| J @ −20° C. | Std | 0.97 | 1.06 | 0.57 | 0.54 | |
| (ASTM D5628) | | | | | | |
| Falling Tup Impact, | Mn | 1.2 | 0.9 | 1.0 | 0.8 | |
| J @ −40° C. | Std | 0.31 | 0.20 | 0.24 | 0.14 | |
| (ASTM D5628) | | | | | | |
| Color (Hunter "Lab") | L | 66.5 | 67.0 | 71.2 | 69.2 | |
| | a | 0.42 | 0.21 | −0.44 | −0.70 | |
| | b | 5.00 | 4.35 | 3.51 | 4.27 | |

[1]6814 = Tegopren ® 6814;
1107 = Dow Corning 1107;
and 6875-45 = Tegopren ® 6875-45.
Mn = mean;
Std = standard deviation.
Note: molded color measured with Minolta CR-300.
*composite composed of run Nos. 4740, 4787, 4788 and 4794.
**talc conc. corrected to 28.6%.

Example 6

This example illustrates other useful flexural modulus modifying agents.

Other flexural modulus modifying agents were evaluated to determine their effect on the stiffness of talc reinforced PP/EPDM TPOs. Other possible flexural modulus modifying agents evaluated include polyethylene glycol (PEG 200® available from Union Carbide), polypropylene glycol, calcium stearate (Ca Stearate), and a lubricant package used in PVC (Rheolub 1800-020, a combination of PE 18 and PS 1650 available from Allied Signal), as shown in Table 6A, and fatty acid ester (PE-18, available from Allied Signal), paraffin wax (Rheo 145, available from Allied Signal), the reaction product of calcium carbonate and stearic acid in wax (PS 1650, available from Allied Signal) and Rheolub, as shown in Table 6B.

In the case of PEG and polypropylene glycol, the talc was surface-treated in the high-intensity Papenmeier. The calcium stearate, and Rheolub 1800-020, PE-18, Rheo 145 and PS 1650, which are powders, were dry blended with the talc. The additive level was 1% based on the talc. The treated talc or talc/additive blends were compounded with a 60/40 mixture of PP and EPDM in the counter-rotating twin-screw Leistritz extruder. The compounds were injection molded and tested according to ASTM and ISO methods. The results of mechanical testing on talc-reinforced 60/40 PP/EPDM TPOs are shown in Tables 6A and 6B.

TABLE 6A

Mechanical Properties of 60/40 Blend

| ID | | 4921 | 4922 | 4855 | 4856 | 4988 | 4989 | 4857 |
|---|---|---|---|---|---|---|---|---|
| Surface Treatment or additive | | none | Tegopren ® | Rheolub | Ca Stearate | Polypropylene Glycol | Stearic Acid | PEG 200 ® |
| Talc Conc. % | | 24.9 | 24.6 | 23.7 | 27.1 | 25.3 | 23.6 | 26.5 |
| Flex Modulus, kg$_f$/mm$^2$ | Mn | 90 | 137 | 136 | 96 | 114 | 143 | 162 |
| (ISO 178) | Std | 2.42 | 2.96 | 4.53 | 5.37 | 4.39 | 4.89 | 2.40 |
| Tensile Yield Stress, kg$_f$/mm | Mn | 1.84 | 1.83 | 1.88 | 1.97 | 1.86 | 1.98 | 2.00 |
| (ISO 527-2/1A/50) | Std | 0.02 | 0.03 | 0.03 | 0.02 | 0.037 | 0.027 | 0.02 |
| Izod Impact, kJ/m$^2$ | Mn | 71.1 | 69.7 | 70.4 | 69.0 | 80.1 | 87.2 | 68.3 |
| (ISO 180/1A) | Std | 5.75 | 2.87 | 1.44 | 0.72 | 3.45 | 3.09 | 1.44 |
| Falling Tup Impact, J @ 23° C. | Mn | 14.6 | 14.4 | 14.0 | 14.5 | 14.2 | 14.0 | 13.9 |
| (ASTM D5628) | Std | 0.4 | 0.8 | 0.1 | 0.2 | 0.35 | 0.22 | 0.2 |
| Falling Tup Impact, J @ −20° C. | Mn | 16.5 | 16.8 | 16.5 | 16.8 | 16.8 | 17.5 | 16.7 |
| (ASTM D5628) | Std | 0.5 | 0.3 | 0.69 | 1.6 | 0.45 | 0.42 | 1.8 |
| Falling Tup Impact, J @ −40° C. | Mn | 17.8 | 18.1 | 15.2 | 15.3 | 17.9 | 18.0 | 17.0 |
| (ASTM D5628) | Std | 0.8 | 0.8 | 3.0 | 2.7 | 0.50 | 0.91 | 2.6 |

TABLE 6A-continued

Mechanical Properties of 60/40 Blend

| ID | | 4921 | 4922 | 4855 | 4856 | 4988 | 4989 | 4857 |
|---|---|---|---|---|---|---|---|---|
| Color (Hunter | L | 63.05 | 69.15 | 69.16 | 60.8 | 71.69 | 68.48 | 72.02 |
| "Lab") | a | 0.86 | −0.70 | −0.07 | 1.50 | −0.80 | −0.20 | −0.59 |
| | b | 4.31 | 3.64 | 4.92 | 5.24 | 4.03 | 4.45 | 4.46 |

Mn = Mean:
Std = standard deviation.
Note:
molded color measured with Minolta CR-300.

TABLE 6B

Mechanical Properties of 60/40 Blend

| ID | | 4887 | 4889 | 4888 | 4855 |
|---|---|---|---|---|---|
| Surface treatment or additive | | PE-18 | Rheo 145 | PS 1650 | Rheolub |
| Additive description | | Fatty acid ester | Paraffin wax | In situ calcium | Combination of |
| Talc Conc. % | | 26.3 | 25.7 | 26.7 | 23.7 |
| Flex Modulus, $kg_f/mm^2$ | Mn | 141 | 83 | 153 | 136 |
| (ISO 178) | Std | 1.81 | 1.31 | 3.41 | 4.53 |
| Tensile Yield Stress, $kg_f/mm$ | Mn | 1.98 | 1.73 | 1.92 | 1.88 |
| (ISO 527-2/1A/50) | Std | 0.01 | 0.03 | 0.01 | 0.03 |
| Izod Impact, $kJ/m^2$ | Mn | 73.3 | 74.7 | 74.0 | 70.4 |
| (ISO 180/1A) | Std | 1.44 | 2.16 | 0.72 | 1.44 |
| Falling Tup Impact, J @ 23° C. | Mn | 13.5 | 13.6 | 14.2 | 14.0 |
| (ASTM D5628) | Std | 0.2 | 0.2 | 0.2 | 0.1 |
| Falling Tup Impact, J @ −20° C. | Mn | 10.8 | 17.8 | 17.2 | 16.5 |
| (ASTM D5628) | Std | 0.8 | 0.5 | 1.2 | 0.69 |
| Falling Tup Impact, J @ −40° C. | Mn | 2.9 | 18.6 | 17.8 | 15.2 |
| (ASTM D5628) | Std | 1.6 | 0.2 | 1.5 | 3.0 |
| Color (Hunter "Lab") | L | 68.5 | 61.78 | 66.79 | 69.16 |
| | a | −0.29 | 0.67 | −0.04 | 0.07 |
| | b | 5.24 | 4.68 | 4.13 | 4.92 |

Mn = mean;
Std = standard deviation.
Note:
molded color measured with Minolta CR-300.

As shown in Tables 6A and 6B, fatty acid ester, polypropylene glycol, Rheolub, PEG 200® and PS 1650 also improve the flexural modulus of talc reinforced PP/EPDM TPO. In most cases, they did not significantly affect the tensile or impact properties.

Example 7

This example illustrates the effect of polysiloxane on stiffness in a blend of a reactor grade high impact copolymer, high molecular weight silicone additive and maleate PP used for scratch/mar resistance in automotive interior trim.

A summary of the flexural modulus test data is shown in Table 7.

TABLE 7

Effect of Tegopren ® on Stiffness in Scratch/Mar Formulation

| ID | 4609 | 4637 | 4613 |
|---|---|---|---|
| Talc | 610 | 610 | None |
| Talc Conc. % | 25.0 | 28.0 | — |
| Tegopren ® 6875 Conc., % | 0 | 1.0 | — |
| Flex Modulus, $kg_f/mm^2$ | 223.9 | 289.9 | 109.5 |
| % Increase in Flex Mod | — | 29.5 | — |
| % Increase after correction for concentration differences | — | 23.3 | — |

As shown in Table 7, the surface treatment of talc with Tegopren® results in a significant increase in the flexural modulus in a talc-reinforced commercial pre-blended TPO. In addition, it was observed that Tegopren® also significantly improved molded color.

Example 8

This example illustrates the effect of a flexural modulus modifying agents on reactor grade copolymer Montel 7624 and homopolymer Amoco 1046.

As shown in Table 8, a flexural modulus modifying agent does not improve flexural modulus in this reactor grade copolymer 7624 or homopolymer 1046.

TABLE 8

The Effect of Tegopren ® on the Mechanical Properties in 7624 and 1046

| ID | | 4697 | 4698 | 4699 | 4700 |
|---|---|---|---|---|---|
| Resin Type | | 7624 | 7624 | 1046 | 1046 |
| Tegopren ® 6875 Conc., % | | 0 | 1.0 | 0 | 1.0 |
| Flex Modulus, $Kg_f/mm^2$ | Mn | 274 | 267 | 272 | 260 |
| (ISO 178) | Std | 7.72 | 3.72 | 6.08 | 5.94 |
| Yield Stress, $Kg_f/mm^2$ | Mn | 2.75 | 2.74 | 2.79 | 2.79 |
| (ISO 527) | Std | 0.013 | 0.045 | 0.021 | 0.015 |
| Yield Strain, % | Mn | 8.32 | 9.16 | 8.58 | 9.04 |
| (ISO 527) | Std | 0.065 | 0.443 | 0.504 | 0.490 |
| Long Term Heat Aging in Forced Air Oven @ 150° C., days | | 97 | 123 | 111 | 123 |
| Strain @ Break, % | Mn | 72 | 118 | 122 | 98 |

TABLE 8-continued

The Effect of Tegopren ® on the Mechanical Properties in 7624 and 1046

| ID | | 4697 | 4698 | 4699 | 4700 |
|---|---|---|---|---|---|
| (ISO 527) | Std | 31 | 47 | 26 | 10 |
| Izod Impact, kJ/m$^2$ | Mn | 20.1 | 15.8 | 15.1 | 15.1 |
| (ISO 180) | Std | 2.8 | 0.71 | 1.43 | 0.71 |
| Falling Tup Impact, J | Mn | 17.1 | 17.0 | 16.6 | 15.3 |
| (ASTM D5628) | Std | 0.59 | 0.98 | 0.71 | 0.81 |
| Color (Hunter "Lab") | L | 67.69 | 67.15 | 65.38 | 67.52 |
| | a | −0.64 | −0.82 | −0.81 | −0.79 |
| | b | 3.70 | 3.64 | 2.38 | 3.73 |

Mn = mean;
Std = standard deviation;

The Tegopren® surface-treatment did not affect the tensile or impact properties in either Montel 7624® (high impact copolymer) or Amoco 1046® (homopolymer). The flexural modulus modifying agent improved the long-term heat aging performance as shown in Table 8. It is anticipated that it will also improve UV resistance of these plastics.

Example 9

This example illustrates the effect of flexural modulus modifying agents on UV stability.

Talc was surface treated with an alkyl/ester-modified siloxane emulsion (Tegopren® 6875-45) in the high-intensity Papenmeier mixer and dried. The resulting product was compounded at about 25% in a mixture of a PP homopolymer and EPDM rubber in a counter-rotating twin screw extruder. A phthalo blue colorant was included. The compounds were injection molded.

Impact plaques were exposed to ultraviolet radiation in a QUV Accelerated Weathering Tester for 400 hours. The UV source was a type UVB-313 fluorescent lamp with wavelengths ranging from 280 to 315 nm. The samples were exposed to UV radiation for 12 hrs/day alternating 1 hour of exposure with 1 hour of darkness. The temperature in the QUV Tester was 40° C. The color of the plaques were measured after every 50 hours of exposure. The effect of UV exposure on color is shown in Table 9.

TABLE 9

Effect of UV Exposure on Color.

| ID | 4641 | 4642 | 4643 | 4644 | 4645 | 4646 |
|---|---|---|---|---|---|---|
| Talc | 710 | 710 | 700C | 700C | 674 | 674 |
| Talc Conc. wt % | 25.6 | 26.0 | 26.7 | 26.3 | 25.8 | 28.5 |
| Tegopren ® Conc., wt % | 0 | 2.2 | 0 | 2.2 | 3.0 | 2.2 |
| UV Exposure | | | Hunter "Lab" Color | | | |
| 0 hrs (control) | | | | | | |
| L | 34.25 | 33.24 | 34.94 | 34.26 | 33.03 | 34.71 |
| a | −2.45 | −1.03 | −3.87 | −2.72 | −5.53 | −6.3 |
| b | −26.56 | −28.6 | −22.87 | −23.56 | −18.61 | −19.71 |
| 400 hrs | | | | | | |
| L | 41.26 | 36.84 | 62.08 | 40.51 | 60.27 | 58.21 |
| a | −5.01 | −3.73 | −11.13 | −5.79 | −10.02 | −11.08 |
| b | −20.79 | −23.89 | −14.18 | −17.89 | −12.97 | −13.41 |
| ΔE | 9.43 | 6.51 | 29.41 | 8.98 | 28.18 | 24.79 |

Note:
UV exposed surface facing up to simulate service.

As shown in Table 9 above, the lower ΔE demonstrates less color shift due to UV exposure for the samples with flexural modulus modifying agent.

Example 10

This example illustrates the effect of using a compacted talc.

About 1.1 pounds (lbs) of Tegopren® 6875-45 emulsion, about 7.5 lbs of water and about 50 lbs of Cimpact 610 talc were mixed for 15 minutes in a Littleford FM130. This material was then compacted into pellets using a California pellet-mill with about 0.25-inch die. The pellets were dried to <1% moisture content in a Witte fluid-bed dryer at 350° F., which required approximately 7 minutes. The dry screen test was used to access pellet quality or integrity, with JetFil 625C talc as a control. To determine friability, the bulk density was measured after 15 and 30 seconds exposure in a coffee mill. The results are shown in Table 10A.

TABLE 10A

Talc Pellet Quality or Integrity.

| ID | | Tegopren ® compacted* | Tegopren ® powder* | Untreated powder* | JetFil 625C SR981216 |
|---|---|---|---|---|---|
| Prior to exposure in coffee mill | Mn | 17.77[1] | 5.53 | 4.80 | 15.36 |
| | Std | 0.24 | 0.21 | 0.99 | 0.25 |
| 15 sec. In coffee mill | Mn | 4.70 | 4.09 | 3.38 | 3.16 |
| | Std | 0.13 | 0.05 | 0.06 | 0.05 |
| 30 sec. In coffee mill | Mn | 4.34 | 3.93 | 3.58 | 3.04 |
| | Std | 0.21 | 0.08 | 0.10 | 0.11 |
| % Retained on dry screen per Timmins test method[2] | | 50 | — | — | 25 |

[1]bulk density in g/in$^3$ determined by filing 1 in$^3$ container.
[2]Timmins method uses No. 10 screen with 100 g of material.
*Cimpact 610.

The compacted talc with Tegopren® had excellent pellet integrity as indicated by 50% retention using the dry screen test, but the pellets were also soft and friable. The bulk density drops about 75% with 15 seconds exposure in a coffee mill compared to about 80% for 625C talc. The density after 15 seconds exposure in a coffee mill is approximately equal to the density of the original powder.

The Tegopren® compacted pellets were compounded with an 80/20 physical blend of PP and EPDM in the counter-rotating twin-screw Leistritz extruder and compared with compounds produced with powder form material. The compounds were injection molded and tested according to ASTM and ISO methods. Results of mechanical property tests on the resulting materials are shown in Table 10B. This example demonstrates that the treated talc can be compacted to reduce dust and decrease problems associated with compounding powders due to their low bulk density.

TABLE 10B

Comparison of Mechanical Properties of 80/20 Blend TPOs with Compacted or Powder Talc.

| ID | | 4831 | Composite* |
|---|---|---|---|
| Talc Conc. | | 28.6 | ** |
| Talc Form | | compacted | powder |
| Flex Modulus, kg$_f$/mm$^2$ | Mn | 239 | 238 |
| (ISO 178) | Std | 1.89 | 19.6 |
| Izod Impact, kJ/m$^2$ | Mn | 16.5 | 17.4 |
| (ISO 180/1A) | Std | 1.44 | 5.10 |
| Falling Tup Impact, J @ 23° | Mn | 14.5 | 15.0 |
| (ASTM D5628) | Std | 0.47 | 0.85 |

Mn = mean; Std = standard deviation.
*composite composed of run Nos. 4740, 4787, 4788 and 4794.
**talc conc. corrected to 28.6%

This example demonstrates that there products can be used in a compacted form without alteration in properties.

Table 10C illustrates the mechanical properties of compounds produced by feeding compacted and powder form material into the vacuum port of the extruder to avoid the high intensity mixing element of the screws. This simulates a condition of poor distribution and dispersion mixing which might be encountered in a commercial operation. This is compared to compounds fed into the rear feed port.

TABLE 10C

Dispersion versus Mechanical Properties

| | | ID | | | |
|---|---|---|---|---|---|
| | | 4995 | 5023 | 4994 | 5024 |
| | | Feed Port | | | |
| | | Rear | Vacuum | Rear | Vacuum |
| | | | | Form | |
| | | Powder | Powder | Compacted | Compacted |
| | | | | Talc Conc % | |
| | | 27.5 | 27.3 | 26.7 | 24.2 |
| Flex Modulus, MPa | Mn | 1551 | 1695 | 1557 | 1524 |
| (ISO 189) | Std | 43.7 | 45.5 | 22.2 | 42.3 |
| Izod Impact, kJ/m2 | Mn | 19.8 | 18.4 | 19.0 | |
| (ISO 180/1A) | Std | 0.4 | 0.46 | 0.28 | |
| Yield Stress, MPa | Mn | 72.6 | 66.8 | 71.9 | 66.8 |
| | Std | 0.72 | 2.16 | 2.16 | 3.59 |
| Falling Tup Impact, | Mn | 14.1 | 13.5 | 14.4 | 13.4 |
| J @ 23° C. | Std | 0.15 | 0.28 | 0.22 | 0.16 |
| (ASTM D5628) | | | | | |
| Falling Tup Impact, | Mn | 18.7 | 15.5 | 18.2 | 16.9 |
| J @ -20° C. | Std | 0.5 | 1.6 | 0.71 | 0.37 |
| (ASTM D5628) | | | | | |
| Color | L | 69.93 | 69.57 | 70.11 | 69.7 |
| (Hunter "Lab") | a | -0.45 | -0.40 | -0.41 | -0.49 |
| | b | 4.01 | 4.12 | 3.79 | 3.66 |

Table 10C indicates a slight reduction in both Izod and falling-tup impact when the talc is introduced into the vacuum port. This effect is consistent with less dispersive mixing. However, the small change suggests that Tegopren® compacted materials are easily dispersed.

Example 11

This example illustrates the effect of Tegopren® surface treatment on the long-term heat aging (LTHA) performance.

The TPOs were prepared using a standard procedure and were exposed to 140° C. or 150° C. air in a forced-air oven for 992 hours. The time to failure, measured in days, and color were compared to unconditioned controls, and the results are shown in Tables 11A and 11B, respectively.

TABLE 11A

LHTA at 150° C. in Air

| PP/EPDM Ratio | 80/20 | | | | 60/40 | | | |
|---|---|---|---|---|---|---|---|---|
| Talc Conc., % | 0 | 15 | 27 | 40 | 0 | 15 | 27 | 40 |
| | | | Time to Failure, days | | | | | |
| w/Tegopren ® | 120 | 118 | 105 | 90 | — | 96 | 87 | 41 |
| w/o Tegopran ® | 132 | 95 | 80 | 18 | 98 | 81 | — | 13 |

Failure was determined by visual degradation of 10% of more of the surface area of the molded part. The test was conducted according to ASTM D794-93, entitled "Determining Permanent Effect of Heat on Plastics." As the above table demonstrates, the Tegopren® surface treatment improves the long term heat aging of the MFTPO.

TABLE 11B

The Effect of Thermal aging in 140° C. Air on Color

| ID | 4744 | 4740 | 4742 | 4743 |
|---|---|---|---|---|
| PP/EPDM | 80/20 | 80/20 | 60/40 | 60/40 |
| Talc Conc. | 27.1 | 27.1 | 27.9 | 26.8 |
| Tegopren ® | no | yes | no | yes |
| 0 hrs | | | | |
| L | 67.18* | 70.44 | 61.56 | 68.04 |
| a | 0.42* | -0.42 | 0.65 | -0.39 |
| b | 3.89 | 3.67 | 4.15 | 2.91 |
| 505 hrs | | | | |
| L | 59.88 | 70.64 | 59.95 | 71.84 |
| a | 2.44 | 0.08 | 2.42 | 0.51 |
| b | 8.72 | 6.77 | 9.12 | 8.01 |
| 992 hrs | | | | |
| L | 56.48 | 67.67 | 57.34 | 67.57 |
| a | 2.71 | 0.46 | 2.80 | 0.75 |
| b | 9.70 | 7.97 | 10.94 | 9.09 |
| ΔE | | | | |
| 505 hrs | 8.93 | 3.15 | 5.52 | 6.42 |
| 992 hrs | 12.39 | 5.19 | 8.28 | 6.30 |

Color measurements with Minolta CR-300;
*talc concentration only 24.2% in control Tegopren® treated TPOs have a higher retention of color after LTHA as indicated by the lower ΔE. The aged TPOs containing Tegopren® are considerably brighter after aging than the TPOs containing untreated talc, e.g., the "L" values are about 10 points higher with Tegopren®.

Example 12

This example illustrates the effect of Tegopren® surface treatment as a function of median particle size of talc.

Using standard conditions, TPOs containing Tegopren® treated 325-mesh talc and TPOs containing untreated 325-mesh talc were prepared. The talc used in this example was obtained from Luzenac America, Inc. (Stellar 420, Lot No. HO12148). It is a 325 mesh product with a median particle size (mps) of 11.4 $\mu$m and a $D_{85}$ of 23.0 $\mu$m. Whereas, Cimpact 610 talc has a mps of 2.84 $\mu$m and a $D_{85}$ of 6.10 $\mu$m. The effect of Tegopren® on 325 mesh talc-reinforced PP/EPDM TPOs and change in flexural modulus versus particle size are shown in Tables 12A and 12B, respectively.

TABLE 12A

The Effect of Tegopren ® on
325 Mesh Talc-Reinforced PP/EPDM TPO

| ID | | 4789 | 4790 | 4791 |
|---|---|---|---|---|
| Talc Conc. | | 0 | 28.8 | 28.5 |
| Tegopren ® 6875-45 Conc., % | | 0 | 0 | 2.2 |
| Flex Modulus, $kg_f/mm^2$ | Mn | 64 | 93 | 124 |
| (ISO 178) | Std | 1.00 | 1.20 | 1.24 |
| Izod Impact, $kJ/m^2$ | Mn | 69.7 | 56.1 | 55.3 |
| (ISO 180/1A) | Std | 2.16 | 1.44 | 0.72 |
| Falling Tup Impact, J | Mn | 13.0 | 11.3 | 11.9 |
| (ASTM D5628) | Std | 0.05 | 0.23 | 0.41 |

TABLE 12B

Change in Flexural Modulus vs. Particle Size

| ID | 4790 | 4791 | 4742 | 4743 |
|---|---|---|---|---|
| Talc | Stellar 420 | Stellar 420 | Cimpact 610 | Cimpact 610 |
| Talc Conc. | 28.8 | 28.5 | 27.9 | 26.8 |
| Tegopren ® 6875-45 Conc., % | no | yes | no | yes |
| Flex Modulus, kg$_f$/mm$^2$ | 93 | 124 | 97 | 143 |
| Increase w/Tegopren ®, % |  | 33 |  | 47 |

As shown in Table 12A, the surface treatment of 325-mesh talc with Tegopren® results in TPOs with a significantly higher flexural modulus than untreated talc reinforced TPOs, without affecting impact performance. In Table 12B, in fact, it appears the effect of Tegopren® on flexural modulus is greater with finer talc.

Example 13

The preceding examples involved TPOs produced with a 5 melt-flow (MF) polypropylene homopolymer. Since TPOs may be produced with higher MF polypropylenes, this example illustrates the effect of melt-flow on the flexural modulus of PP/EPDM TPO reinforced with Tegopren® surface-treated talc. While not wishing to be bound by any theory, it is believed that the flexural modulus of a TPO is dependent on the composition and the microstructure. It has been demonstrated that the addition of talc to PP/EPDM TPOs alters the morphology. The talc-reinforced TPO exhibited improved distribution of the elastomer phase plus a significant reduction in the size of the elastomer domains. This was attributed to better distributive and dispersive mixing due to an increase in the viscosity of the PP phase as a result of the talc. Melt-flow is related to viscosity, i.e., the higher the MF, the lower the viscosity. With high MF polypropylenes the difference in viscosities between the elastomer and plastic is greater. This should have a negative effect on the dispersion of the rubber phase and may alter the effect of a flexural modulus modifying agent.

In this example, the mechanical properties obtained with Tegopren® were compared to those obtained with untreated talc in PP/EPDM blends produced with 12 and 20 MF polypropylene homopolymers.

As in previous examples, the pretreatment was done in the high intensity mixer. The treatment level of Tegopren® 6875-45 emulsion was 2.2%, which corresponds to approximately 1% active ingredient. The treated talc was dried and compounded with a 60/40 physical blend of PP and EPDM in the counter-rotating twin-screw Leistritz extruder. The compounds were injection molded and tested according to ASTM and ISO methods.

The study was also extended to evaluate polyethylene glycol (PEG), which was observed to produce the same effect as Tegopren® on flexural modulus. The PEG was applied neat to the talc in the high-intensity Papenmeier mixer.

The results of mechanical testing on talc-reinforced 60/40 PP/EPDM TPOs produced with 5, 12 and 20 MF polypropylenes are presented in the following tables.

TABLE 13A

Mechanical Properties vs. PP Melt-Flow With and Without Tegopren ®

| ID | 4821 | 4742 | 4822 | 4929 | 4930 | 4932 | 4923 | 4924 | 4925 |
|---|---|---|---|---|---|---|---|---|---|
| PP Melt Flow, g/10 min | 5 | 5 | 5 | 12 | 12 | 12 | 20 | 20 | 20 |
| Talc Conc. | 0 | 27.9 | 26.1 | 0 | 25.0 | 26.1 | 0 | 27.3 | 26.5 |
| Tegopren ® 6875-45, % | 0 | 0 | 2.2 | 0 | 0 | 2.2 | 0 | 0 | 2.2 |
| Flex Modulus, MPA (ISO 178) |  |  |  |  |  |  |  |  |  |
| Mn | 627 | 951 | 1441 | 697 | 1314 | 1808 | 651 | 1140 | 1329 |
| Std | 13.2 | 17.8 | 23.3 | 7.14 | 31.3 | 8.82 | 4.97 | 31.0 | 13.2 |
| Flex Mod* @ 27%, MPa | — | 940 | 1469 | — | 1363 | 1846 | — | 1135 | 1342 |

Abbreviations: Mn = mean;
Std = standard deviations.
*values corrected to 27% talc concentrations The flexural modulus data with and without the PEG surface treatment are presented in the following table.

TABLE 13B

Mechanical Properties vs. PP Melt-Flow with and without PEG

| ID | 4742 | 4857 | 4930 | 4931 | 4924 | 4937 |
|---|---|---|---|---|---|---|
| PP Melt Flow, g/10 min | 5 | 5 | 12 | 12 | 20 | 20 |
| Talc Conc. | 27.9 | 26.5 | 25.0 | 22.6 | 27.3 | 26.4 |
| PEG Conc., % | 0 | 1.0 | 0 | 1.0 | 0 | 1.0 |
| Flex Modulus, MPa (ISO 178) |  |  |  |  |  |  |
| Mn | 951 | 1584 | 1314 | 1529 | 1140 | 1635 |
| Std | 17.8 | 23.5 | 31.3 | 38.4 | 31.0 | 21.4 |
| Flex Mod* @ 27%, MPa | 940 | 1602 | 1363 | 1691 | 1135 | 1657 |

*values connected to 27% talc concentration

The flexural modulus corrected to 27% talc loading is graphically presented in FIG. 3. The standard deviations for the corrected values are assumed to be the same as those in Tables 13A and 13B.

Tegopren® and PEG significantly improved the flexural modulus of PP/EPDM TPOs produced with higher melt-flow polyproplene homopolymers as shown in the following table.

TABLE 13C

Improvement in Flexural Modulus vs. Surface Treatment

| PP melt-flow | 5 | 12 | 20 |
|---|---|---|---|
| Surface Treatment | % Increase in Flex Mod | | |
| Tegopren ® | 56 | 35 | 18 |
| PEG | 70 | 24 | 46 |

The talc used in this example was a commercial product from Luzenac America, Inc. (Compact 610). It is a 6 hegman product with a mps of 2.74 µm and a $D_{85}$ of 6.10 µm. The surface treatment was 45% nonionic emulsion of alkyl ester polydimethylsiloxane (Tegopren® 6875-45) from Goldschmidt Chemical Corporation. The polyethylene glycol used was PEG 200® from Union Carbide. The polymers used in this study are described in the following table.

TABLE 13D

Materials Used

| ID | Description | Manufacturer |
|---|---|---|
| 1046 | 5 MF polypropylene homopolymer | Amoco |
| P4G4B 036 | 12 MF polypropylene homopolymer | Huntsman |
| PP 7634 | 20 MF polypropylene homopolymer | Amoco |
| Keltan E801 | EPDM | DSM Copolymer |

Example 14

This example illustrates the effect of Clariant Corp. Hostastat HS 1 ("HS 1"), a sodium alkane sulfonate, on the mineral filled TPO, both with and without the presence of Tegopren®.

Talc was surface treated with an alkyl/ester-modified siloxane emulsion (e.g., Tegopren® 6875-45). In certain composites, the talc was also treated with HS 1. In a further composite, talc was surface treated with only HS 1. The resulting product was compounded in a physical mixture of PP homopolymer and EPDM rubber in a counter-rotating twin screw extruder. The resulting mixture was injection molded. The results of the various mechanical property tests are given in Table 14A.

TABLE 14A

Mechanical Properties of Talc Reinforced 60/40 Blend w/HS 1 and Tegopren ®

| ID | | 5014 | Composite* | 5026 | 5025 |
|---|---|---|---|---|---|
| Surface Treatment | | None | Tegopren ® | Teg/HS 1 | HS 1 |
| Tegopren ®/HS 1 Ratio | | 0/0 | 100/0 | 17/10 | 0/100 |
| Talc Conc % | | 27.2 | 28.0 | 25.3 | 27.1 |
| Flex Modulus, MPa (ISO 178) | Mn | 1007 | 1561 | 1761 | 2073 |
| | Std | 53.4 | 90.5 | 92.3 | 72.0 |
| Tensile Yield Stress, MPa (ISO 527-2/1A/50) | Mn | 19.3 | 18.9 | 18.6 | 19.2 |
| | Std | 0.22 | 0.30 | 0.59 | 0.36 |
| Izod Impact, KJ/m2 (ISO 180/1A) | Mn | 71.9 | 70.0 | 69.0 | 63.2 |
| | Std | 2.16 | 3.30 | 1.44 | 2.87 |
| Falling Tup Impact, J @ 23° C. (ASTM D5628) | Mn | 14.8 | 14.0 | 14.7 | 13.9 |
| | Std | 0.45 | 0.20 | 0.62 | 0.47 |
| Falling Tup Impact, J @ -20° C. (ASTM D5628) | Mn | 17.7 | 17.6 | 17.0 | 16.6 |
| | Std | 0.46 | 0.60 | 0.31 | 0.42 |
| Falling Tup Impact, J @ -40° C. (A5TM D5628) | Mn | 18.6 | 18.0 | 17.9 | 13.4 |
| | Std | 0.42 | 1.30 | 0.26 | 2.32 |
| Color (Hunter "Lab") | L | 60341 | 69.56 | 70.25 | 69.28 |
| | a | 0.85 | -0.40 | -0.62 | -0.42 |
| | b | 4.48 | 3.83 | 3.01 | 3.62 |

*run numbers 4968, 4991, 4995, 5015, 5016

As shown in Table 14A, the presence of HS 1 increases the flexural modulus, both with and without the presence of Tegopren®, without affecting impact properties Table 14B shows the effect of the HS 1 concentration on the mechanical properties of the resultant blend. The example utilizes a 60/40 PP to EPDM ratio.

TABLE 14B

HS 1 Concentration Effect

| | | ID | | |
|---|---|---|---|---|
| | | 5044 | 5069 | 5103 |
| | | HS 1 Conc % | | |
| | | None | 0.2 | 1.0 |
| | | Talc Conc % | | |
| | | 27.2 | 26.1 | 26.3 |
| Flex Modulus, MPa (ISO 178) | Mn | 996 | 1532 | 2156 |
| | Std | 9.1 | 33 | 59 |
| Tensile Yield Stress, MPa (ISO 527-2/1A/50) | Mn | 19.6 | 19.4 | 19.7 |
| | Std | 0.04 | 0.17 | 0.07 |
| Izod Impact, KJ/m2 (ISO 180/1A) | Mn | 69.7 | 72.8 | 70.4 |
| | Std | 2.16 | 1.44 | 2.16 |
| Falling Tup Impact, J @ 23° C. (ASTM D5628) | Mn | 14.7 | 14.3 | 14.5 |
| | Std | 0.20 | 0.30 | 1.36 |
| Color (Hunter "Lab") | L | 65.96 | 72.61 | 71.97 |
| | a | 0.49 | -0.17 | -0.42 |
| | b | 3.92 | 3.14 | 3.44 |

As shown in Table 14B, the concentration of HS 1 has a significant effect on the flexural modulus but does not appear to have any effect on the other mechanical properties.

Table 14C numerically depicts the effect of HS 1 and Tegopren® on the process stability, as shown by comparing the melt viscosities after multiple passes through the extruder with the original compound. FIG. 5 graphically depicts this effect.

TABLE 14C

Effect of HS 1 and Tegopren ® on Process Stability

| Surface Treatment | Talc Conc % | Number of Passes 1st | 5th | Viscosity Change, % $100(1-\eta_5/\eta_1)$ | Change in Molded Color ΔE |
|---|---|---|---|---|---|
| None | 27.2 | 62,900 | 56,900 | -10 | 7.6 |
| Tegopren ® | 27.7 | 57,000 | 53,900 | -5 | 6.27 |
| HS 1 | 26.3 | 52,300 | 52,300 | +0 | 1.8 |

Table 14C shows that the largest change in melt viscosity was observed in the case of the untreated control. The change in melt viscosity indicates a reduction in molecular weight or crosslinking of the polymer, both of which are undesirable. The materials and the manufacturers of those materials used in this example are presented in Table 14D.

TABLE 14D

Materials Used

| ID | Description | Manufacturer |
|---|---|---|
| Cimpact 710 | 7-hegman talc | Luzenac America, Inc. |
| Tegopren ® 6875-45 | Ester alkyl polydimethylsiloxane | Goldschmidt |
| Hostastat HS 1 | Sodium alkane sulfonate | Clariant Corp. |
| PP 1046 | 5 MF polypropylene homopolymer | Amoco |
| Keltan E801 | EPDM 75 wt % ethylene and 4.5 wt % ENB | DSM Copolymer |

Example 15

This example illustrates the effect of Tegopren® and HS 1 in TPOs based upon metallocene produced elastomers. Table 15A illustrates the mechanical properties of TPOs made with ethylene-octene elastomers and EPDM.

TABLE 15A

Mechanical Property Comparison of TPOs based on Metallocene Elastomers

| Elastomer Type | Nordel ® EPDM | | | Engage ® Ethylene-Octene Elastomer | | | Exact ® Ethylene-Octene Elastomer | | |
|---|---|---|---|---|---|---|---|---|---|
| Chemical Surface Treatment | None | Tegopren ® | HS 1 | None | Tegopren ® | HS 1 | None | Tegopren ® | HS 1 |
| Talc Conc % | 25.5 | 26.6 | 27.8 | 27.7 | 25.0 | 27.5 | 26.8 | 29.4 | 26.5 |
| Flex Modulus, MPA (ISO 178) | 1368 | 1787 | 1903 | 1618 | 1500 | 1685 | 1814 | 1873 | 1765 |
| Flex Mod @ 27% | 1406 | 1802 | 1869 | 1595 | 1564 | 1667 | 1818 | 1800 | 1780 |
| Falling Tup Impact @ 23° C. (ASTM D5628) | 14.7 | 14.0 | 14.2 | 15.4 | 14.1 | 14.1 | 15.0 | 15.2 | 14.4 |
| | 0.2 | 0.3 | 0.4 | 1.14 | 0.45 | 0.38 | 0.15 | 0.68 | 0.14 |
| Falling Tup Impact @ −20° C. (ASTM D5628) | 17.6 | 17.4 | 18.7 | 18.6 | 19.0 | 17.2 | 18.4 | 17.7 | 17.4 |
| | 0.9 | 0.7 | 0.2 | 1.30 | 0.8 | 0.45 | 0.99 | 0.38 | 0.31 |
| Color (Hunter "Lab") | 63.60 | 72.16 | 72.98 | 70.92 | 72.9 | 71.08 | 62.60 | 70.33 | 67.93 |
| | 0.17 | −0.61 | −0.43 | 0.00 | −0.49 | −0.57 | 0.33 | −0.65 | −0.52 |
| | 4.16 | 3.47 | 2.96 | 4.12 | 3.33 | 1.48 | 4.86 | 3.05 | 1.48 |

Table 15A demonstrates that Tegopren® and HS 1 provides significantly higher flexural modulus than an untreated control talc in EPDM based TPOs. It also demonstrates that HS 1 and Tegopren® are equivalent when used with the ethylene-octene elastomers and that improve the color of molded parts.

The materials used and manufacturer of those materials used in this example are shown in Table 15B.

TABLE 15B

Materials Used

| ID | Description | Manufacturer |
|---|---|---|
| Tegopren ® 6875-45 | Ester alkyl polydimethylsiloxane | Golschmidt |
| Hostastat HS 1 | Sodium alkane sulfonate | Clariant Corp. |
| EPDM | Nordel IP NDR-3745P | DuPont Dow Elastomer |
| Engage ® | Engage ® 8150/ethylene-octene elastomer | DuPont Dow Elastomers |
| Exact ® | Exact ® 8201/ethylene-octene elastomer | Exxon |
| PP | 1046 PP homopolymer/MF of 5 | Amoco |

Example 16

The preceding examples involved TPOs produced with a 5 melt-flow (MF) polypropylene homopolymer. Since TPOs may be produced with higher MF polypropylenes, this example illustrates the effect of melt-flow on the flexural modulus of PP/EPDM TPO reinforced with HS 1 surface-treated talc. As in previous examples, the pretreatment was done in the high intensity mixer. The treatment level of HS 1 was approximately 1% active ingredient. The treated talc was dried and compounded with a 60/40 physical blend of PP and EPDM in the counter-rotating twin-screw Leistritz extruder. The compounds were injection molded and tested according to ASTM and ISO methods.

The results of mechanical testing on talc-reinforced 60/40 PP/EPDM TPOs produced with 5, 12 and 20 MF polypropylenes are presented in the following tables.

TABLE 16

Mechanical Properties of PP Melt-Flow with and without HS 1

| ID | Comp. | 5025 | 5100 | 5101 | 5078 | 5120 |
|---|---|---|---|---|---|---|
| PP Melt Flow, g/10 min | 5 | 5 | 12 | 12 | 20 | 20 |
| HS 1 Conc., % | 0 | 1 | 0 | 1 | 0 | 1 |
| Talc Conc., % | 28.2 | 27.1 | 24.3 | 26.3 | 23.5 | 28.8 |
| Flex Modulus, MPA (ISO 178) | | | | | | |
| Mn | 996 | 2073 | 1385 | 1871 | 1337 | 2040 |
| Std | 12 | 72 | 83 | 56 | 56 | 12 |
| Flex Mod @ 27%, MPa | 996 | 2067 | 1463 | 1903 | 1438 | 1953 |
| Tensile Stress, MPa (ISO 527-2) | | | | | | |
| Mn | 19.1 | 19.2 | 18.4 | 18.8 | 16.6 | 18.0 |
| Std | 0.23 | 0.36 | 0.37 | 0.09 | 0.20 | 0.24 |
| Izod Impact, kJ/m$^2$ | | | | | | |
| Mn | 73.7 | 63.2 | 69.7 | 67.6 | 64.7 | 64.7 |
| Std | 1.8 | 2.87 | 2.16 | 2.16 | 1.44 | 0.72 |
| Falling tup impact, J @ 23° C. (ASTM D5628) | | | | | | |
| Mn | 14.6 | 13.9 | 13.4 | 13.0 | — | 13.6 |
| Std | 0.40 | 0.47 | 0.16 | 0.20 | — | 0.28 |

TABLE 16-continued

Mechanical Properties of PP Melt-Flow with and without HS 1

| ID | Comp. | 5025 | 5100 | 5101 | 5078 | 5120 |
|---|---|---|---|---|---|---|
| Falling tup impact, J @ −20° C. (ASTM D5628) | | | | | | |
| Mn | 17.8 | 16.6 | 14.9 | 15.8 | — | 17.0 |
| Std | 0.40 | 0.42 | 1.60 | 1.00 | — | 0.70 |
| Falling tup impact, J @ −40° C. (ASTM D5628) | | | | | | |
| Mn | 14.8 | 13.4 | 14.8 | 14.2 | — | 13.4 |
| Std | 1.4 | 2.3 | 1.40 | 3.60 | — | 0.8 |
| Color (Hunter "Lab") | | | | | | |
| L | 67.01 | 69.28 | 67.01 | 71.94 | 69.51 | 73.20 |
| a | −0.50 | −0.42 | −0.50 | −0.60 | −0.62 | −0.71 |
| b | 3.95 | 3.62 | 3.95 | 3.34 | 3.99 | 4.00 |

As is obvious from Table 16, HS 1 significantly improved the flexural modulus of PP/EPDM TPOs produced with higher melt-flow polypropylene homopolymer without affecting impact performance.

Example 17

The effect of Tegopren® and HS 1 on heat deflection is shown in the following example. Heat Deflection Temperature (HDT) is an indicator of the performance of a material at elevated temperatures. The tests were performed at 66 psi, according to ASTM D 648. The surface treatments were applied as described in previous examples. The treated talc was dried and compounded with an 80/20 and a 60/40 physical blend of PP and EPDM in the counter-rotating twin-screw Leistritz extruder. The compounds were then injection molded and tested. The talc loadings were approximately 15 and 27%.

TABLE 17

Effect of Tegopren ® and HS 1 on HDT

| EPDM Type | E801 | | E801 | | 3745 |
|---|---|---|---|---|---|
| PP/EPDM Ratio | 80/20 | | 60/40 | | 60/40 |
| Talc Conc. % | 15 | 27 | 15 | 27 | 27 |
| | | | HDT, ° C. | | |
| w/Tegopren ® | 125 | 132 | 96 | 112 | 122 |
| w/o Tegopren ® | 91 | 98 | 67 | 72 | 110 |
| ΔT | 34 | 34 | 29 | 40 | 12 |
| w/HS 1 | — | — | — | 109 | 123 |
| w/o HS 1 | — | — | — | 59 | 110 |
| ΔT | — | — | — | 50 | 13 |

E801 = DSM Keltan
3745 = DuPont Dow Elastomer Nordel ® IP NDR 3745P
Both the Tegopren ® and HS 1 surface treatment significantly increase the heat deflection temperature.

Example 18

The following examples demonstrate the effect of a polyether polyol, such as Dowfax, and fatty acid amines and amides on the mechanical properties of a treated MFTPO.

TABLR 18A

Mechanical Properties of Talc Reinforced 60/40 Blend w/ Polyether Polyol, and fatty acid amines and amides

| ID | | 5232 | 5292 | 5293 |
|---|---|---|---|---|
| Surface Treatment | | Polyether Polyol | Fatty Acid Amine | Fatty Acid Amide |
| Additive Conc % | | 1.0 | 1.0 | 1.0 |
| Talc Conc % | | 25.5 | 29.9 | 32 |
| Flex Modulus, MPa | Mn | 1644 | 2011 | 2085 |
| (ISO 178) | Std | 28.1 | 49.0 | 22.0 |
| Flex Modulus corrected to 27% | | 1692 | 1875 | 1859 |
| Izod Impact, KJ/m2 | Mn | 64.7 | 63.4 | 64.7 |
| (ISO 180/1A) | Std | 2.2 | 2.2 | 2.2 |

Each of these surface treatments increased the flexural modulus of the resultant MFTPO and, thus, each of these surface treatments can be utilized as alternative embodiments of the present invention. The materials used in this example are contained in Table 18B.

TABLE 18B

Materials Used

| ID | Description | Manufacturer |
|---|---|---|
| Cimpact 710 | 7-hegman talc | Luzenac America, Inc. |
| Fatty Acid Amine (Monoamine ACO-100) | Lauramide DEA/2:1 molar reaction of diethanolamine with lauric acid | Unigema |
| Fatty Acid Amide (Monoamid 150-ADD) | Cocamide DEA and diethanolamine/1:1 molar reaction of diethanolamine and coconut oil based acid | Unigema |
| Polyether Polyol (Dowfax ® WP 130) | Polyether polyol with a propyleneoxide backbone capped with ethylene oside with 3 OH end groups | Dow |

Example 19

The following example demonstrates the effect of using a polypropylene copolymer with Tegopren® treated talc on the mechanical properties of the resultant MFTPO. The talc was compounded with a physical blend of EPDM and a high impact PP copolymer in the counter rotating twin screw Leistritz extruded. The compounds were injection molded and tested.

TABLE 19

Mechanical Properties of PP Copolymer and Blends with EPDM

| ID | | 5043 | 5035 | 5036 |
|---|---|---|---|---|
| PP Copolymer/EPDM Ratio | | 80/20 | 80/20 | 80/20 |
| Tegopren ® 6875-45% | | — | 0 | 2.2 |
| Talc Conc % | | 0 | 24.6 | 27.3 |
| Flex Modulus, MPa | Mn | 863 | 1964 | 2228 |
| (ISO 189) | Std | 37.9 | 65.4 | 64.5 |
| Flex Mor. @ 27%, MPa | | — | 2070 | 2210 |
| Izod Impact, kJ/m2 | Mn | 19.1 | 22.6 | 22.0 |
| (ISO 180/1A) | Std | 0.08 | 0.43 | 0.22 |
| Yield Stress, MPa | Mn | 64.7 | 73.3 | 68.3 |
| | Std | 4.31 | 2.16 | 2.16 |
| Falling Tup Impact, J @ 23° C. | Mn | 45.6 | 15.9 | 16.8 |
| (ASTM D5628) | Std | 0.42 | 0.27 | 0.27 |
| Falling Tup Impact, J @ −20° C. | Mn | 17.4 | 19.4 | 19.4 |
| (ASTM D5628) | Std | 0.56 | 0.41 | 0.31 |

TABLE 19-continued

Mechanical Properties of PP Copolymer and Blends with EPDM

| ID | | 5043 | 5035 | 5036 |
|---|---|---|---|---|
| PP Copolymer/EPDM Ratio | | 80/20 | 80/20 | 80/20 |
| Falling Tup Impact, J @ −40° C. | Mn | 19.2 | 17.9 | 20.8 |
| (ASTM D5628) | Std | 0.60 | 4.43 | 0.54 |
| Color (Hunter "Lab") | L | 51.26 | 67.08 | 70.25 |
| | a | −0.99 | −0.51 | −0.29 |
| | b | −1.52 | 3.33 | 3.55 |

The above table demonstrates that the use of Tegopren® with a PP copolymer will increase the flexural modulus, as well as the molded color, of the resultant MFTPO.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A thermoplastic elastomer composition comprising an elastomer polymer, a thermoplastic polymer, a mineral, and a flexural modulus modifying agent, wherein said flexural modulus modifying agent increases the flexural modulus without substantially affecting the impact resistance relative to the composition in the absence of said flexural modulus modifying agent and said flexural modulus modifying agent is selected from the group consisting of polysiloxanes, polyols, fatty acids, fatty acid amines, fatty acid amides, polyether polyols, glycols, fatty acid esters, alkyl sulfonates, aryl sulfonates, in situ calcium stearate in wax and mixtures thereof; and and wherein said composition has a flexural modulus increase of at least about 15% relative to the composition in the absence of said flexural modulus modifying agent.

2. The thermoplastic elastomer composition of claim 1, wherein said elastomer is selected from the group consisting of EPDM, EPR, POE, and mixtures thereof.

3. The thermoplastic elastomer composition of claim 1, wherein said thermoplastic is polypropylene.

4. The thermoplastic elastomer composition of claim 1, wherein said composition comprises from about 5% by weight to about 55% by weight of said elastomer polymer.

5. The thermoplastic elastomer composition of claim 1, wherein said composition comprises from about 45% by weight to about 95% by weight of said thermoplastic polymer.

6. The thermoplastic elastomer composition of claim 1, wherein said mineral is talc.

7. The thermoplastic elastomer composition of claim 1, wherein said composition comprises from about 5% by weight to about 50% by weight of said mineral.

8. The thermoplastic elastomer composition of claim 1, wherein said flexural modulus modifying agent is present in an amount from about 0.1% by weight to about 5% by weight of said mineral.

9. The thermoplastic elastomer composition of claim 1, wherein the difference in impact strength using a falling tup test between said composition and the composition in the absence of said flexural modulus modifying agent is about 10% or less.

10. The thermoplastic elastomer composition of claim 1, wherein said composition has a greater L value on the Hunter "Lab" color scale relative to the composition in the absence of said flexural modulus modifying agent.

11. The thermoplastic elastomer composition of claim 1, wherein said elastomer is selected from the group consisting of styrene block copolymers, thermoplastic olefins, thermoplastic vulcanizates, thermoplastic polyurethanes, copolyamides, PVC blends, and thermoplastic copolyester elastomers.

12. The thermoplastic elastomer composition of claim 11, wherein said elastomer is EPDM.

13. The thermoplastic elastomer composition of claim 11, wherein said composition has a flexural modulus increase of at least about 15% relative to a composition in the absence of said flexural modulus modifying agent.

14. The thermoplastic elastomer composition of claim 1, wherein a difference between the falling weight impact strength of said composition and the composition in the absence of said flexural modulus modifying agent is about 10% or less.

* * * * *